US008400434B2

(12) United States Patent
Oka et al.

(10) Patent No.: US 8,400,434 B2
(45) Date of Patent: Mar. 19, 2013

(54) INFORMATION PROCESSING APPARATUS, INFORMATION PROCESSING METHOD, AND PROGRAM THEREFOR

(75) Inventors: Hiromitsu Oka, Tokyo (JP); Toshio Ohkouchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1075 days.

(21) Appl. No.: 12/024,537

(22) Filed: Feb. 1, 2008

(65) Prior Publication Data

US 2009/0033639 A1 Feb. 5, 2009

(30) Foreign Application Priority Data

Mar. 30, 2007 (JP) ................................ 2007-090927

(51) Int. Cl.
*G06F 3/033* (2006.01)

(52) U.S. Cl. ........ 345/184; 345/156; 715/810; 715/833; 715/834; 381/104; 381/107; 381/109

(58) Field of Classification Search .................. 345/184, 345/156; 715/810, 830, 833, 834; 381/104, 381/107, 109, 119; 200/179, 19.03, 19.07, 200/19.18, 19.19; 701/418, 419
See application file for complete search history.

(56) References Cited

U.S. PATENT DOCUMENTS

| | | | | |
|---|---|---|---|---|
| 5,745,057 | A * | 4/1998 | Sasaki et al. | 341/35 |
| 7,596,233 | B2 * | 9/2009 | Hsieh | 381/109 |
| 2004/0100440 | A1 * | 5/2004 | Levin et al. | 345/156 |
| 2005/0083300 | A1 * | 4/2005 | Castle | 345/157 |
| 2006/0215857 | A1 * | 9/2006 | Hirano | 381/119 |
| 2007/0279401 | A1 * | 12/2007 | Ramstein et al. | 345/184 |
| 2008/0034289 | A1 * | 2/2008 | Doepke et al. | 715/700 |

FOREIGN PATENT DOCUMENTS

| | | | |
|---|---|---|---|
| JP | 9-93688 | A | 4/1997 |
| JP | 11-68484 | A | 3/1999 |
| JP | 2001-356769 | A | 12/2001 |
| JP | 2002-335137 | A | 11/2002 |
| JP | 2005-148438 | A | 6/2005 |
| JP | 2005-196476 | | 7/2005 |
| JP | 2006-270886 | | 10/2006 |

OTHER PUBLICATIONS

[mRX-8000] http://sinpo55555.com/mRX-8000.html, 1 page.
[Cubase] http://www.steinberg.net/1026_0.html, Nov. 30, 2007, 1 page.
Japanese Office Action issued on May 17, 2011 in corresponding Japanese Application No. 2007-090927.
Japanese Office Action issued Apr. 17, 2012, in Japan Patent Application No. 2007-090927.

* cited by examiner

*Primary Examiner* — Lun-Yi Lao
*Assistant Examiner* — Priyank Shah
(74) *Attorney, Agent, or Firm* — Oblon, Spivak, McClelland, Maier & Neustadt, L.L.P.

(57) ABSTRACT

Provided is an information processing apparatus including a display control unit and an output unit. The display control unit displays image data of an operation unit including a rotary operation dial, and displays while rotating, according to a designated target volume value, the operation dial from a rotation angle position corresponding to a current volume value to a rotation angle position corresponding to the target volume value based on at least one of a predetermined speed and a predetermined acceleration speed. The output unit outputs a volume value corresponding to the rotation angle position of the operation dial displayed by the display control unit.

16 Claims, 21 Drawing Sheets

| $\theta$ cur (° ) | Sound Volume Level To Be Output (dB) |
|---|---|
| 0 ($\theta$ min) | −∞ |
| 36 | −70 |
| 70 | −60 |
| 112 | −50 |
| 146 | −40 |
| 185 | −30 |
| 220 | −20 |
| 256 | −15 |
| 280 | −10 |
| 293 | −5 |
| 300 ($\theta$ max) | 0 |

INFORMATION PROCESSING APPARATUS, INFORMATION PROCESSING METHOD, AND PROGRAM THEREFOR

CROSS REFERENCES TO RELATED APPLICATIONS

The present invention contains subject matter related to Japanese Patent Application JP 2007-090927 filed in the Japanese Patent Office on Mar. 30, 2007, the entire contents of which being incorporated herein by reference.

BACKGROUND OF THE INVENTION

1. Field of the Invention

The present invention relates to an information processing apparatus used in an audio apparatus or other apparatuses expressed by GUI (Graphical User Interface), an information processing method, and a program therefor.

2. Description of the Related Art

Up to now, there have been techniques using GUI in a case of setting various parameters including a volume in audio-related apparatuses (see, for example, Japanese Patent Application Laid-open No. 2005-196476 (paragraph (0013), FIGS. 2 and 3)). Japanese Patent Application Laid-open No. 2005-196476 particularly describes GUI which functions as a compressor that is an effecter for compressing a dynamic range of musical sounds in a musical sound generation apparatus.

In a musical sound generation apparatus (1) according to Japanese Patent Application Laid-open No. 2005-196476, operation elements (13) including an input level dial (35) included in a GUI window (2) expressed by the compressor are operated through operations using a mouse (e.g., drag operation) for PCs (Personal Computer).

Thus, various parameters are set in accordance with the respective operation elements (13).

In addition to the musical sound generation apparatus as disclosed in Japanese Patent Application Laid-open No. 2005-196476, there are also audio-related products expressed by GUI, which are known by the name of “Cubase” and “mRX-8000”, for example.

SUMMARY OF THE INVENTION

The GUIs of the related art as described above have expensive-looking designs in many cases. However, the lightness in motions of the operation elements as targets of the operation of the user give the user an impression different from actual hardware apparatuses, leading to lack of quality.

Alternatively, in a GUI-type audio apparatus as in the related art, there may be a problem that, in a case where the user operates a dial for sound volume level adjustment using a mouse or the like, for example, the sound volume level is drastically changed by an erroneous operation of the user. For example, because the sound volume level adjustment dial is rotatable and is circular in most cases, there is a fear that a large sound unintended by the user is output when the user only slightly moves the cursor through a drag operation using the mouse on the periphery of the center of the sound volume level adjustment dial. In addition, when the sound volume level is drastically raised by the erroneous operation, it becomes offensive to the ear of the user and also results in an increase in load on a speaker.

In view of the above-mentioned circumstances, there is a need for an information processing apparatus including an operation dial with premium accents, an information processing method, and a program therefor.

There is also a need for a technique such as the information processing apparatus, which is capable of reducing a load applied to the user or the speaker.

According to an embodiment of the present invention, there is provided an information processing apparatus including display control means and output means. The display control means causes image data of an operation unit including a rotary operation dial to be displayed, and causes, according to a designated target volume value, the operation dial to be displayed while being rotated from a rotation angle position corresponding to a current volume value to a rotation angle position corresponding to the target volume value based on at least one of a predetermined speed and a predetermined acceleration speed. The output means outputs a volume value corresponding to the rotation angle position of the operation dial displayed by the display control means.

In the embodiment of the present invention, the operation dial is rotated so as to gradually approach the rotation angle position corresponding to the designated target volume value, and processing is performed so that the volume is gradually changed until reaching the target volume value. Accordingly, it is possible to add quality to the movement of the operation dial and to obtain an operational feeling similar to that of actual hardware apparatuses.

The “volume” in this case refers to a level of parameters adjustable by the user, and the volume may be at any level as long as it can be output by the information processing apparatus. In this case, the volume typically is a sound volume level although not limited thereto, and other various parameters such as temperature and brightness may also be used.

When the volume is the sound volume level, the adjustment thereof may mean adjustment of the sound volume level in the entire frequency region constituting the sound, or may mean adjustment of the sound volume level in a partial frequency region thereof, but is typically a sound volume level adjustment in a low-pitch sound region or high-pitch sound region.

The expression “gradually approach” means the operation dial rotating and approaching the rotation angle position corresponding to the target volume value at a constant speed or acceleration speed (including positive and negative concepts). The output means gradually changes the volume in accordance with the rotational movement of the operation dial.

The phrase “operation unit including an operation dial” refers to both cases where the operation dial itself is the operation unit and where a region containing the operation dial and a predetermined surrounding region is the operation unit.

When a volume signal is a sound volume level signal, in the embodiment of the present invention, because the sound volume level gradually changes even when the user erroneously operates the operation dial, the user is not offended in the ear and the load on the speaker is reduced.

In the embodiment of the present invention, the display control means rotates the operation dial at a first speed when the current volume value is smaller than the target volume value and rotates the operation dial at a second speed faster than the first speed when the current volume value is larger than the target volume value. The gradual rise of the sound volume level enables the reduction in load applied to the user and the speaker. On the other hand, because the load on the user and the speaker is low when turning down the sound volume level, there is no problem in changing the volume faster when turning down the sound volume level than at the time of turning up the sound volume level. Thus, quality operation can be maintained and a response can be improved when turning down the sound volume level.

In the embodiment of the present invention, the information processing apparatus further includes operational region setting means setting, on the image data displayed by the display control means, a first region for designating the target volume value according to the rotation angle position of the operation dial and a second region for designating the target volume value as one of a minimum volume value and a maximum volume value. Specifically, in the first region, the target volume value is preset for each of the designated rotation angle positions of the operation dial. In the second region, the minimum or maximum volume value is preset as a certain target volume value. The user is capable of designating the maximum or minimum volume value as the target volume value anywhere in a preset area of the second region. Thus, the user can easily designate the minimum or maximum volume value.

In the embodiment of the present invention, the information processing apparatus further includes restriction region setting means. The restriction region setting means sets on the image data a restriction region in which the target volume value is incapable of being designated. Setting of the restriction region by the restriction region setting means in a region in which the user is apt to perform erroneous operations on the image data of the operation unit can prevent erroneous operations.

For example, the restriction region setting means sets a region that concentrically expands from a center of the operation dial and has an area smaller than that of the operation dial as the restriction region. In this case according to the embodiment of the present invention, the operation dial typically is round, oval, or of a shape close to those two. Alternatively, the operation dial may be of a shape that has three or more apexes substantially the same in distance from the "center of the operation dial", that is, polygon of triangular or more.

Alternatively, the information processing apparatus further includes operational region setting means. The operational region setting means sets, on the image data displayed by the display control means, a first region for designating the target volume value according to the rotation angle position of the operation dial, a second region adjacent to the first region, for designating the target volume value as a maximum volume value, and a third region adjacent to the first region, for designating the target volume value as a minimum volume value. In the information processing apparatus, the restriction region setting means sets a region sandwiched between the second region and the third region as the restriction region.

In the embodiment of the present invention, the display control means rotates the operation dial from the rotation angle position corresponding to the current volume value to the rotation angle position corresponding to an angle of a straight line connecting a center position of the operation dial and a position designated on the image data. Accordingly, appropriate volume control becomes possible.

In the embodiment of the present invention, the information processing apparatus further includes calculation means. The calculation means calculates, when the target volume value is designated by a drag operation on the image data, an angular difference between the rotation angle position of the operation dial corresponding to a start point of the drag operation and the rotation angle position of the operation dial corresponding to an end point of the drag operation. In the information processing apparatus, the output means calculates a change amount of the volume value corresponding to the angular difference. Specifically, processing is performed such that the volume is changed in an amount corresponding to an amount of the rotation angle by which the user has rotated the operation dial, whereby appropriate volume control becomes possible. Thus, intuitive operations are facilitated.

The "drag operation" refers to a so-called drag operation that is performed when the user moves a pointer for indication on a display in a case where a computer or a PC is used, for example. The drag operation is not limited to the drag operation using a mouse, and includes a concept of the drag operation on a touchpad or on a touch panel.

A movement amount of the drag operation refers to an angular difference between the rotation angle position corresponding to the start point of the movement and the rotation angle position corresponding to the end point thereof. Thus, the movement amount of the drag operation is determined irrespective of whether the movement of the pointer by the drag operation is a linear movement or a curve movement.

In the embodiment of the present invention, the display control means rotates, when a position of the end point of the drag operation is outside the operation unit, the operation dial to the rotation angle position corresponding to an angle of a straight line connecting a center position of the operation dial and the position of the end point. Thus, appropriate volume control becomes possible even when the end point of the drag operation is outside the operation unit.

In the embodiment of the present invention, the display control means positions a pointer that moves according to the drag operation on the straight line above the operation dial. Thus, operational feeling becomes closer to that of holding and rotating the operation dial as in the case of the operation dial of the hardware apparatus, whereby intuitive operations become possible.

According to another embodiment of the present invention, there is provided an information processing apparatus including output means and display control means. The output means outputs a volume signal so that, according to a designated target volume value, a current volume value is changed based on at least one of a predetermined speed and a predetermined acceleration speed until the volume value reaches the target volume value. The display control means causes image data of an operation unit including a rotary operation dial to be displayed, and causes the operation dial to be displayed while being rotated from a rotation angle position corresponding to the current volume value to a rotation angle position corresponding to the target volume value based on the at least one of the predetermined speed and the predetermined acceleration speed in an interlocking manner with a change in the volume value.

According to still another embodiment of the present invention, there is provided an information processing method including the steps of: displaying, by display means, image data of an operation unit including a rotary operation dial, and displaying while rotating, according to a designated target volume value, the operation dial from a rotation angle position corresponding to a current volume value to a rotation angle position corresponding to the target volume value based on at least one of a predetermined speed and a predetermined acceleration speed; and outputting a volume value corresponding to the rotation angle position of the operation dial displayed by the display means.

As described above, according to the embodiments of the present invention, it is possible to enhance a premium accent in volume operation. According to the embodiments of the present invention, the load applied to the user or the speaker can be reduced.

These and other objects, features and advantages of the present invention will become more apparent in light of the following detailed description of best mode embodiments thereof, as illustrated in the accompanying drawings.

DESCRIPTION OF PREFERRED EMBODIMENTS

Figure 1:
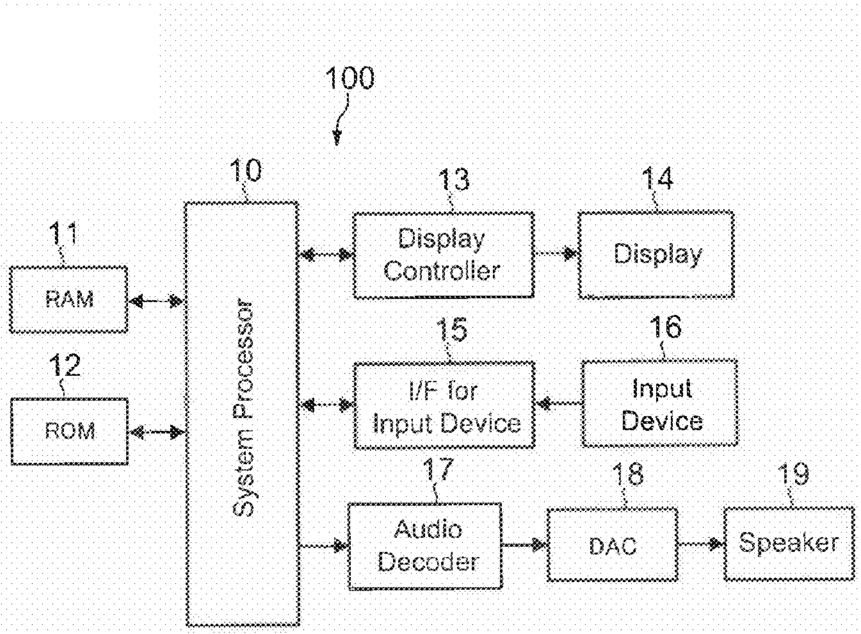
FIG. 1 is a block diagram showing a structure of an audio apparatus according to an embodiment of the present invention.

An audio apparatus 100 includes a system processor 10, an interface 15 for an input device 16, a display controller 13, an audio decoder 17, and a DAC (Digital to Analog Converter) 18. The audio apparatus 100 also includes a RAM 11 and a ROM 12, or other storage apparatuses (not shown) necessary.

Figure 2:
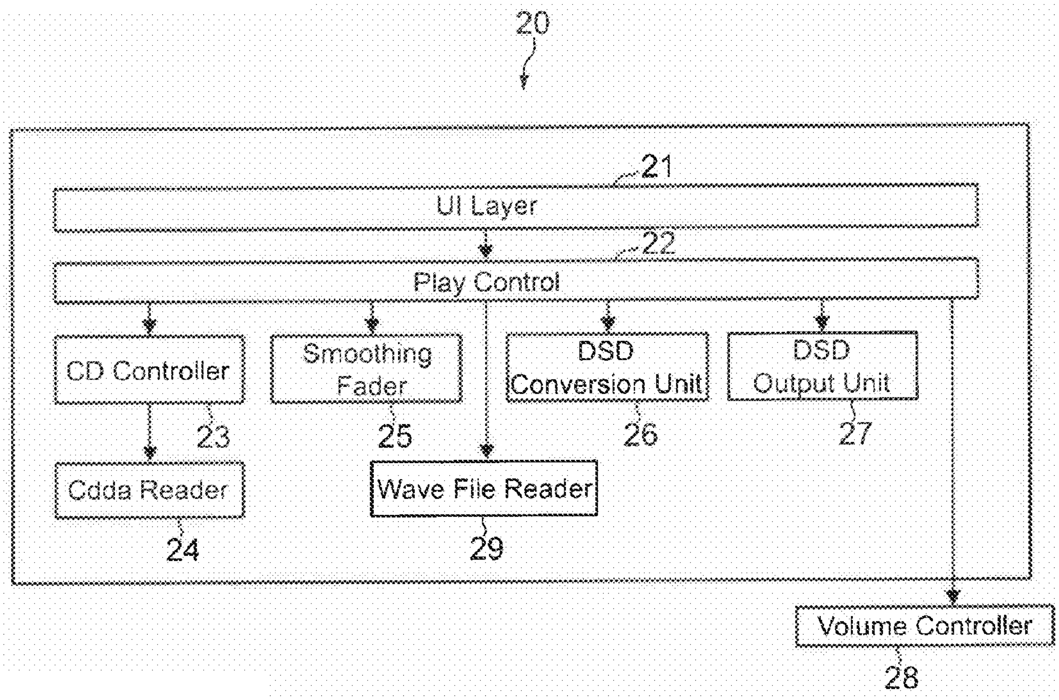
FIG. 2 is a block diagram showing a structure of a DSD unit.

The audio apparatus 100 includes a DSD (Direct Stream Digital) unit 20. FIG. 2 is a block diagram showing a structure of the DSD unit 20. A volume control apparatus (information processing apparatus) is mainly composed of the DSD unit 20. In this example, the DSD unit 20 is composed of software and is stored in, for example, the ROM 12 or the other storage apparatuses. The DSD unit 20 takes in external music data and the like, converts the data into DSD data, and reproduces the music data converted into the DSD data, for example. The DSD unit 20 may partially be composed of hardware.

Referring to FIG. 1, the system processor 10 collectively controls the audio apparatus 100. The system processor 10 is composed of, for example, a CPU, an FPGA (Field Programmable Gate Array), or a DSP (Digital Signal Processor).

Examples of the input device 16 include a keyboard, a mouse, a touchpad, a touch pen, a touch panel on a display 14, a pointing device, and a controller for games, but are not limited thereto. An input signal input by the user using the input device 16 is input to the system processor 10 via the interface 15 for the input device 16.

The display controller 13 controls driving of the display 14. Examples of the display 14 include a liquid crystal display, an EL (Electro-Luminescence) display, a CRT (Cathode Ray Tube) display, and other displays.

The audio decoder 17 decodes DSD data output from the DSD unit 20. The DAC 18 converts a digital signal into an analog signal and outputs the analog signal to a speaker 19 or the like.

As shown in FIG. 2, the DSD unit 20 includes a UI layer 21, a play control 22, a CD controller 23, a Cdda (Compact Disc Digital Audio) reader 24, a smoothing fader 25, a DSD conversion unit 26, a DSD output unit 27, a Wave file reader 29, and a volume controller 28.

The UI layer 21 outputs data for operating the play control 22 based on the input signal from the input device 16. The play control 22 functions as, for example, a class for simplifying crossover utilization of a plurality of objects according to the operation of the UI layer 21.

The Cdda reader 24 rips music recorded on a CD, a DVD, and the like, for example. The CD controller 23 is a wrapper for the Cdda reader 24.

The smoothing fader 25 performs, for example, fade-in/fade-out processing within a short time when a song is reproduced starting from the middle thereof.

The DSD conversion unit 26 converts PCM (Pulse Code Modulation) data and the like into DSD data. The DSD output unit 27 outputs the DSD data to the audio decoder 17. The DSD conversion unit 26 is not used when songs are ripped from a super audio CD (CD stored in advance with DSD data).

The volume controller 28 controls a sound volume level of the audio decoder 17. The sound volume level controlled by the volume controller 28 is a master volume, although not limited thereto. For example, volumes of a low-pitch sound region and high-pitch sound region may also be controlled. Hereinafter, the term "volume (volume value)" refers to a sound volume level unless specifically indicated.

The Wave file reader 29 reads data of Wave-form files.

The main blocks that constitute the volume control apparatus are the system processor 10, the display controller 13, the UI layer 21, the play control 22, and the volume controller 28.

A typical apparatus for realizing the audio apparatus 100 as described above is a PC. However, the audio apparatus 100 can also be realized by an AV apparatus, an audio apparatus mounted to a car navigation apparatus, a PDA (Personal Digital Assistance), a game apparatus, a cellular phone, and other apparatuses capable of reproducing music and the like.

Figure 3:
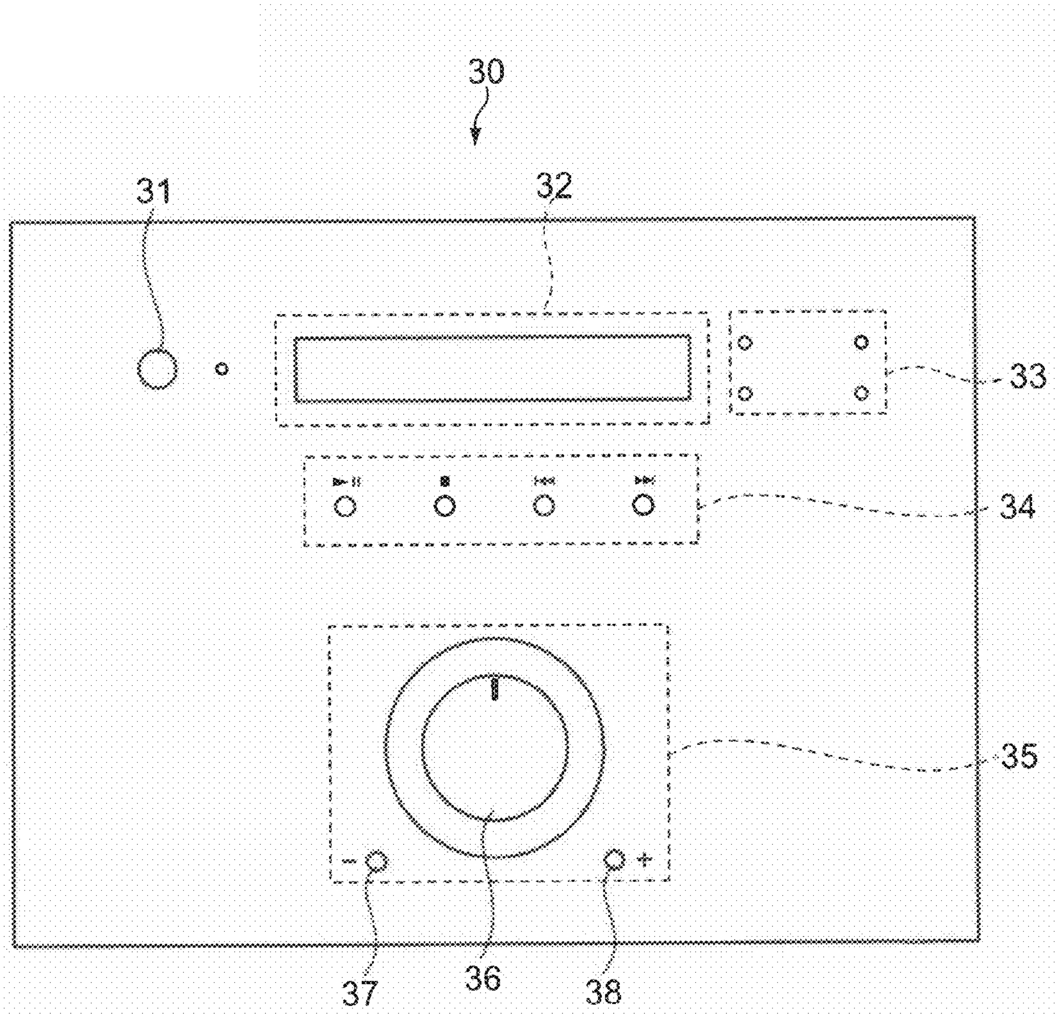
FIG. 3 is a diagram showing an example of GUI of the audio apparatus displayed on a display.

FIG. 3 is a diagram showing an example of GUI of the audio apparatus 100 displayed on the display 14. Hereinafter, the audio apparatus 100 expressed by GUI will be referred to as "audio UI 30".

Figure 4:
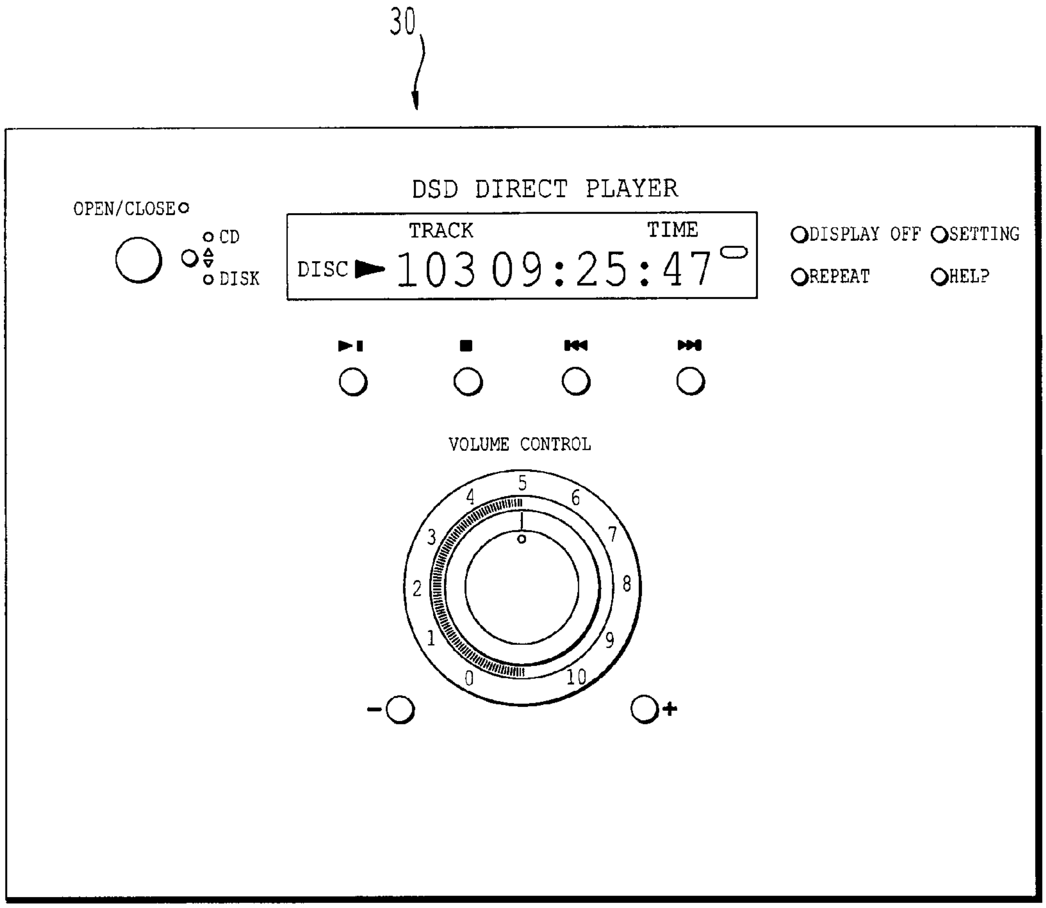
FIG. 4 is a diagram showing an example of an actual audio UI.

The audio UI 30 includes an eject button 31, a display region 32 for displaying various types of information on songs (information on the number of tracks, time, and the like), a control button 33 unique to the PC, a control button 34 for selecting and reproducing a song, and a volume operation unit 35. Arrangement of those buttons and the volume operation unit 35 on the audio UI 30 is a mere example and can be changed arbitrarily. FIG. 4 is a diagram showing an example of the actual audio UI 30.

The volume operation unit 35 is provided with a rotary operation dial 36, and a – button 37 and a + button 38 for minor adjustment of the volume. The operation dial 36 is typically round, but may also be an oval or a shape close to those two, or a polygon. The system processor 10, the UI layer 21, and the display controller 13 mainly function as image output means for outputting image data of the audio UI 30 (particularly image data of the volume operation unit 35) to the display 14.

Figure 5:
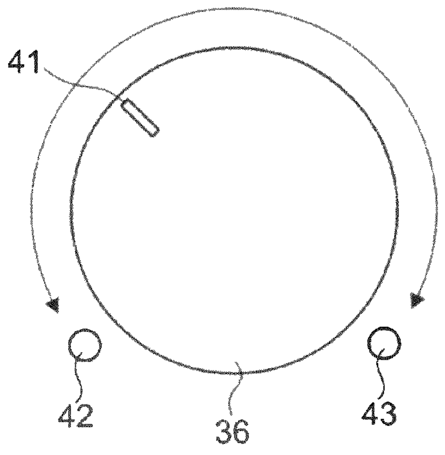
FIG. 5 is a schematic diagram for illustrating a structure and functions of a volume operation unit.

FIG. 5 is a schematic diagram for illustrating a structure and functions of the volume operation unit 35. The volume operation unit 35 includes the operation dial 36 having a part 41 that indicates a current volume value, a part 42 indicating a minimum volume value, and a part 43 indicating a maximum volume value. The part 42 indicating the minimum volume value and the part 43 indicating the maximum volume value are represented by numerals or symbols, for example.

Figure 6A:
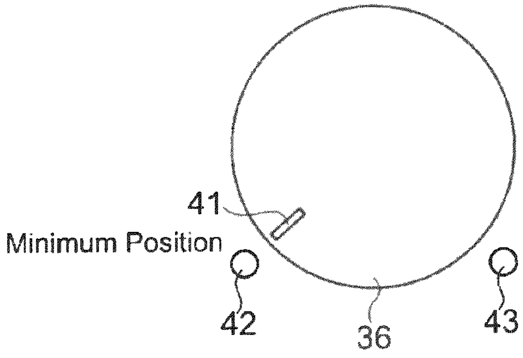
FIG. 6A is a diagram showing an operation dial when a part indicating a current volume value is at a position corresponding to a minimum volume value.
Figure 6B:
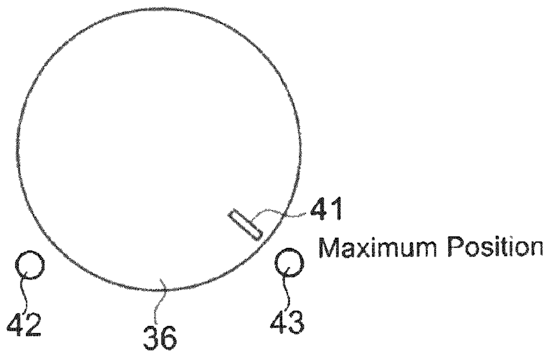
FIG. 6B is a diagram showing the operation dial when the part indicating the current volume value is at a position corresponding to a maximum volume value.

As shown in FIG. 6A, a rotation angle position of the operation dial 36 when the part 41 indicating the current volume value is at a position corresponding to the minimum volume value is called minimum position. As shown in FIG. 6B, the rotation angle position of the operation dial 36 when the part 41 indicating the current volume value is at a position corresponding to the maximum volume value is called maximum position. In addition, a rotation angle position of the operation dial 36 corresponding to the position of the part indicating the current volume value, that is, a current rotation angle position of the operation dial 36 is called current position. The operation dial 36 is capable of rotating from the minimum position to the maximum position.

Figures 7A, 7B:
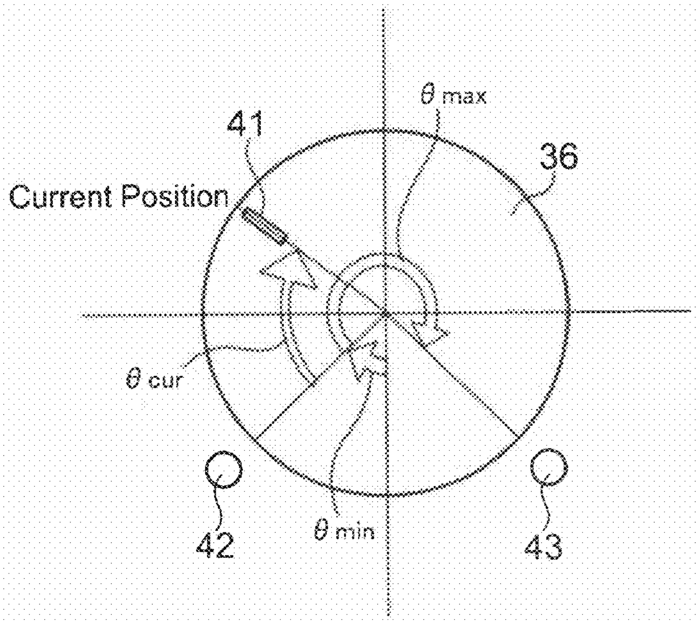
FIG. 7 are diagrams for illustrating rotation angle positions of the operation dial and volume values to be output.

FIGS. 7A and 7B are diagrams for illustrating the rotation angle position of the operation dial 36 and the volume value to be output. In FIG. 7, θmin, θmax, θcur, and θtgt are defined as follows.

(1) An angle formed between the minimum position and the position of 6 o'clock is represented by θmin.

$$(0 \leqq \theta min < 360)$$

(2) An angle formed between the maximum position and the minimum position is represented by θmax.

$$(0 < \theta max \leqq (360 - \theta min))$$

(3) An angle formed between the current position and the minimum position is represented by θcur.

$$(\theta min \leqq \theta cur \leqq \theta max)$$

The volume value to be actually output is determined by the value of θcur. The volume value output when θcur=θmin is set as minimum and the volume value output when θcur=θmax is set as maximum.

(4) The rotation angle position of the operation dial 36 corresponding to a volume value designated by the user (target volume value) via the input device 16 is represented by θtgt (target position).

$$(0 \leqq \theta tgt \leqq \theta max)$$

FIG. 7B is a table showing an example of correspondences between θcur and the volume values to be actually output. This example shows a case where the maximum volume value output from the audio decoder 17 is 0 dB, the minimum volume value is −∞ dB, and θmax is 300 degrees. The correspondences of θcur and the volume values to be actually output are of course not limited to the example in the table shown in FIG. 7B.

As described above, the audio apparatus 100 includes volume signal output means for outputting a volume signal corresponding to the rotation angle position of the operation dial 36. The volume signal output means is mainly composed of the UI layer 21, the play control 22, the system processor 10, and the volume controller 28.

It should be noted that in the example shown in FIG. 7A, the position of 6 o'clock is set as a standard angle position. However, the standard angle position may be at any position, such as 12 o'clock or 3 o'clock.

Figure 8:
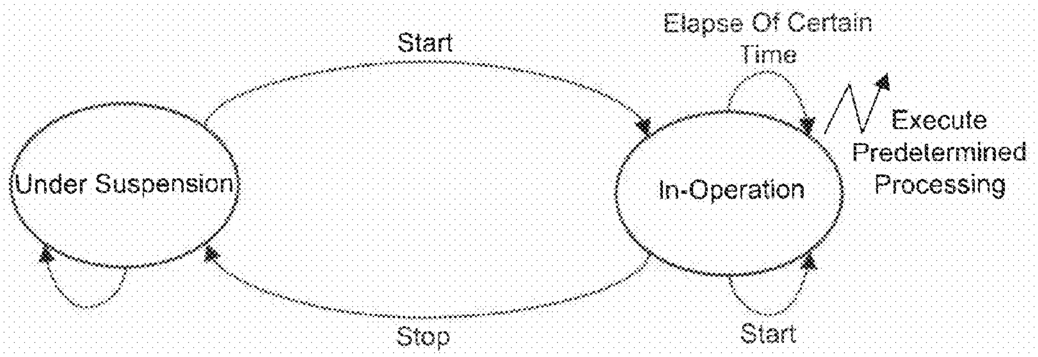
FIG. 8 is a diagram showing status transition of a timer function.

Next, a description will be given of a timer function of the audio apparatus 100. FIG. 8 is a diagram showing status transition of the timer function. A timer is either in an under-suspension status or in-operation status. For example, when the timer is in the in-operation status, the system processor 10 executes predetermined processing every time a certain time elapses. Operations and functions of the timer will be described later in detail.

Figure 9:
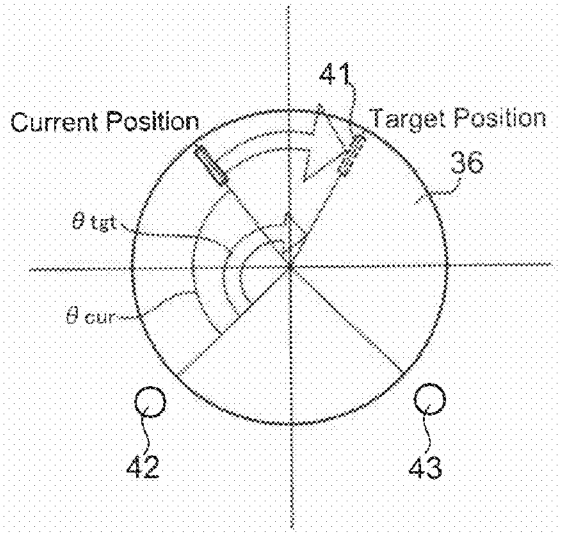
FIG. 9 is a diagram for illustrating a target position corresponding to a target volume value of the operation dial.

FIG. 9 is a diagram for illustrating θtgt. The system processor 10 rotates the operation dial 36 so that the part 41 at the current position θcur gradually approaches the target position θtgt. Further, in this case, the system processor 10 gradually changes the volume until the current volume value reaches the target volume value.

The expression "gradually approaches" means that the operation dial 36 is rotated at a constant speed or an acceleration speed (including positive and negative concepts) so that the part 41 approaches the target position θtgt. The system processor 10 gradually changes the volume in accordance with the rotational movement of the operation dial 36. Therefore, in this case, the system processor 10 changes the volume at a constant speed or an acceleration speed (including positive and negative concepts).

When the current volume value reaches the target volume value, the system processor 10 stops the timer. Here, in this embodiment, the system processor 10 differentiates the rotational speed of the operation dial 36 between a time when the current volume value is smaller than the target volume value and a time when the current volume value is larger than the target volume value. Thus, the change speed of the volume value is changed between increase and decrease of the volume value. The load on the user and the speaker 19 can be reduced by the volume being gradually turned up. On the other hand, because the load on the user and the speaker 19 is less when turning down the volume, there is no problem if the change speed of the volume is higher at the time of turning down the volume than turning up the volume. Accordingly, it is possible to secure quality operation and improve a response when turning down the volume.

However, the present invention is not limited to such embodiment, and the change speed of the volume value may be set to be the same between the time when the current volume value is smaller than the target volume value and the time when the current volume value is larger than the target volume value.

Figure 10:
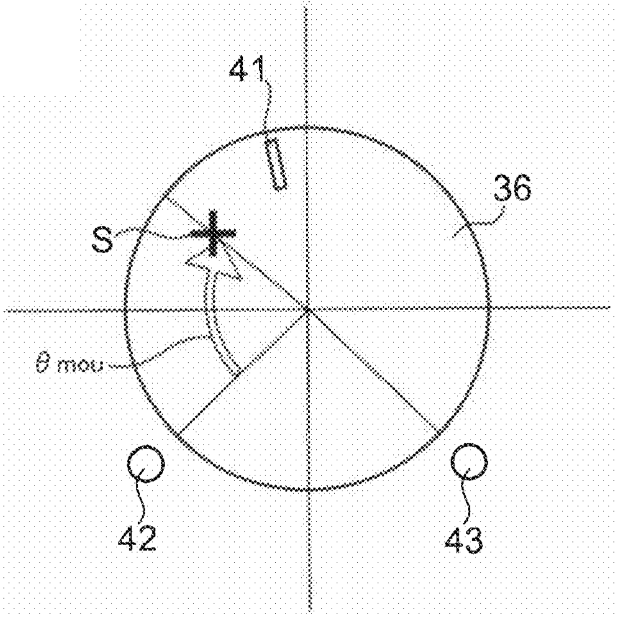
FIG. 10 is a diagram for illustrating a method of designating a volume value by a user.

FIG. 10 is a diagram for illustrating a method of designating a volume value by the user. The user uses the input device 16 to designate a volume value. For example, when using a mouse as the input device 16, the user places a cursor S that moves in accordance with the movement of the mouse on the volume operation unit 35 of the audio UI 30. Then, the user clicks a button of the mouse to designate a volume value.

The "click" in this case refers to an operation of the user pressing the button up to release thereof. There may of course be cases where a device other than the mouse is used as the input device 16 as described above. The "click" of the input device 16 other than the mouse, which has a function that corresponds to the "click" of the mouse, refers to an operation of pressing the button up to release thereof.

The "cursor" is a pointer on the audio UI 30 used by the user to designate an object or access the object on the audio UI 30. The cursor is generally seen in the PC and the like. When the audio UI 30 is displayed on a touch panel-type display, there may be a case where the pointer is not displayed. In the case of such a touch panel-type display, a position designated by the user on the audio UI, which is detected by the touch panel, is considered to be pointed by a pointer.

As shown in FIG. 10, an angle formed between the rotation angle position of the operation dial 36 corresponding to the position of the cursor S that has been clicked on the operation dial 36 and the minimum position is represented by $\theta mou$ ($0 \leqq \theta mou \leqq 360$).

Figure 11:
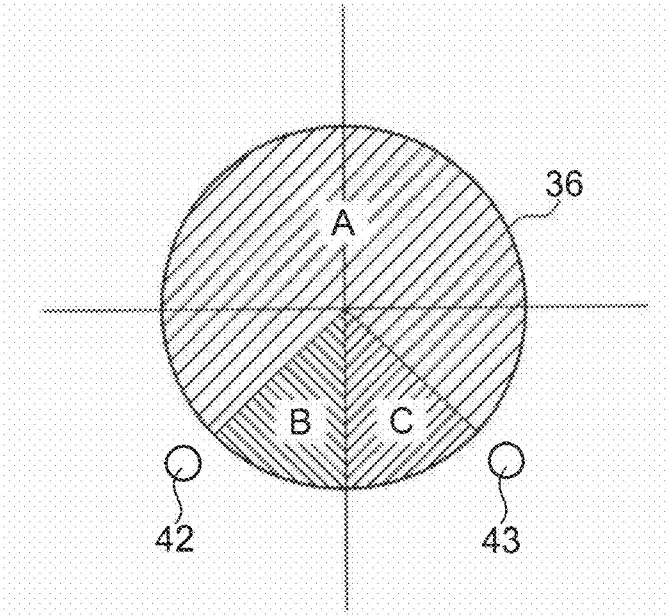
FIG. 11 is a diagram showing operational regions in which the user can designate the volume value by a click.

FIG. 11 is a diagram showing operational regions in which the volume value can be designated by the click of the user. A region of the operation dial 36 from $\theta min$ to $\theta max$ in clockwise is set as a click region A (first region). A region of the operation dial 36 from the position of 6 o'clock to $\theta min$ in clockwise is set as a click region B, and a region of the operation dial 36 from $\theta max$ to the position of 6 o'clock in clockwise is set as a click region C (second region=click region B+click region C).

Processing of the system processor 10 in the case where the click regions A, B, and C are clicked is shown below.

(5) When clicked on the click region A, that is, when $0 \leqq \theta mou \leqq \theta max$, $\theta tgt = \theta mou$ is established, and the system processor 10 starts the timer. Operations of the system processor 10 will be described later in detail.

(6) When clicked on the click region B, $\theta tgt = 0$ is established, and the system processor 10 starts the timer.

(7) When clicked on the click region C, $\theta tgt = \theta max$ is established, and the system processor 10 starts the timer.

The system processor 10 (UI layer 21 and display controller 13) functions as control means for controlling an output of image data so that the operation dial 36 is rotated from the rotation angle position corresponding to the current volume value to the rotation angle position corresponding to the target volume value. In the above conditions (5) to (7), the system processor 10 stops the timer at a time point when the current volume value reaches the target volume value.

In other words, from the above conditions (5) to (7), it can be seen that the click region A is a region for designating an angle-corresponding target volume value which is the target volume value corresponding to the rotation angle position of the operation dial 36. The click region B is a region for designating the minimum volume value as the target volume value that does not depend on the rotation angle position of the operation dial 36. The click region C is a region for designating the maximum volume value as the target volume value that does not depend on the rotation angle position of the operation dial 36.

As described above, the user is capable of designating the minimum volume value as the target volume value anywhere within the click region B. Further, the user is capable of designating the maximum volume value as the target volume value anywhere within the click region C. Accordingly, the user can easily designate the minimum volume value and the maximum volume value.

Additional conditions for the designation method of the target volume value by the click operation will be described with reference to FIG. 12. For example, the target volume value is set to be the same in the click region A in both cases where the click is made at the position P1 and where the click is made at the position P2 on a straight line L1 on the operation dial 36 in a radial direction from the position P1 and is on an outer side thereof. As described above, the system processor 10 rotates the operation dial 36 such that the part 41 is moved to the rotation angle position corresponding to the angle of the straight line L1 (position around 2 o'clock in FIG. 12) connecting the center position O of the operation dial 36 and the position designated by the click (P1 or P2) irrespective of whether the click has been made on the inner or outer circumferential side of the operation dial 36 in the click region A.

Figure 12:
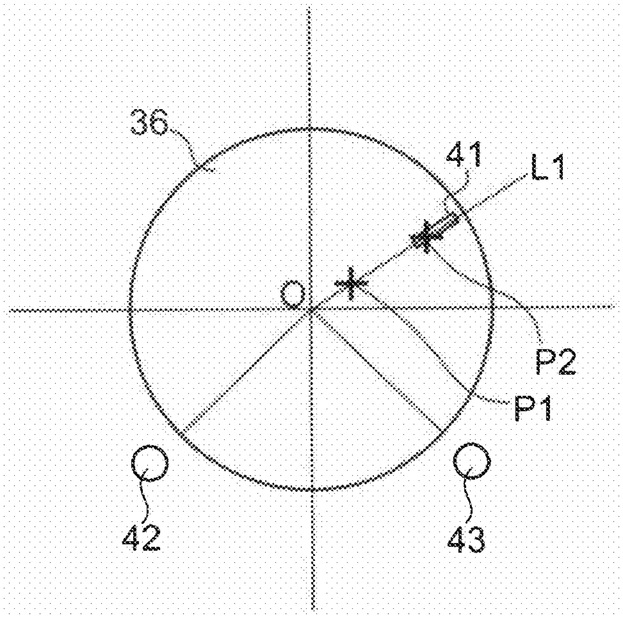
FIG. 12 is a diagram for illustrating conditions for the method of designating the target volume value by the click operation.

FIGS. 11 and 12 have been used to describe the designation of the target volume value by the click operation. Next, a description will be given of a case of designating the target volume value by the user through the so-called "drag operation" using the mouse.

The "drag operation" refers to an operation of the user moving the cursor S displayed on the display 14 while pressing the button of the input device 16 up to release thereof.

In addition, the "drag operation" conceptually contains the "move operation". The "move operation" refers to an operation of the user moving the cursor S displayed on the display 14 while pressing the button of the input device 16 up to temporarily stopping the movement of the cursor S while still pressing the button, and an operation of repeating this operation.

Figure 13:
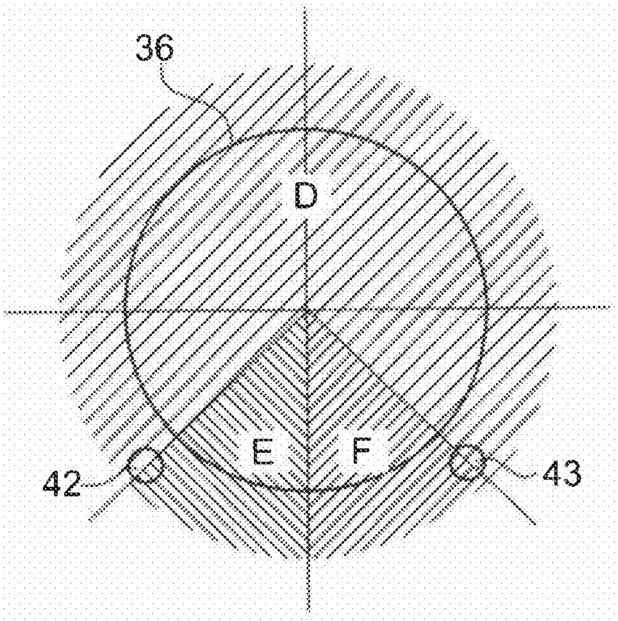
FIG. 13 is a diagram showing operational regions in which a drag operation can be performed.

FIG. 13 is a diagram showing operational regions in which the drag operation can be performed.

(8) When the position of the cursor S in midst of the drag operation is in a drag region D, $\theta tgt = \theta mou$ is established.

(9) When the position of the cursor S in midst of the drag operation is in a drag region E, $\theta tgt = 0$ is established.

(10) When the position of the cursor S in midst of the drag operation is in a drag region F, $\theta tgt = \theta max$ is established.

In FIG. 13, the drag regions D to F are not only provided on the operation dial 36, but also on peripheral regions of the operation dial 36. This is because the user may not be able to perform a proper operation just inside the operation dial 36 since the drag operation involves an operation of moving the cursor S. However, similar to the click regions A to C, the drag regions D to F may only be on the operation dial 36. Alternatively, the click regions A to C may be set so as to stretch out to the peripheral regions of the operation dial 36 as the drag regions D to F.

It should be noted that a range setting of the drag regions D to F in the peripheral regions of the operation dial 36 can appropriately be changed.

Additional conditions for the designation method of the target volume value by the drag operation will be described. The aim is the same as that of the designation method by the click operation described with reference to FIG. 12. For example, in the drag operation, referring again to FIG. 12, the target volume value is the same irrespective of whether the end point is at the position P1 or P2.

Figure 14A:
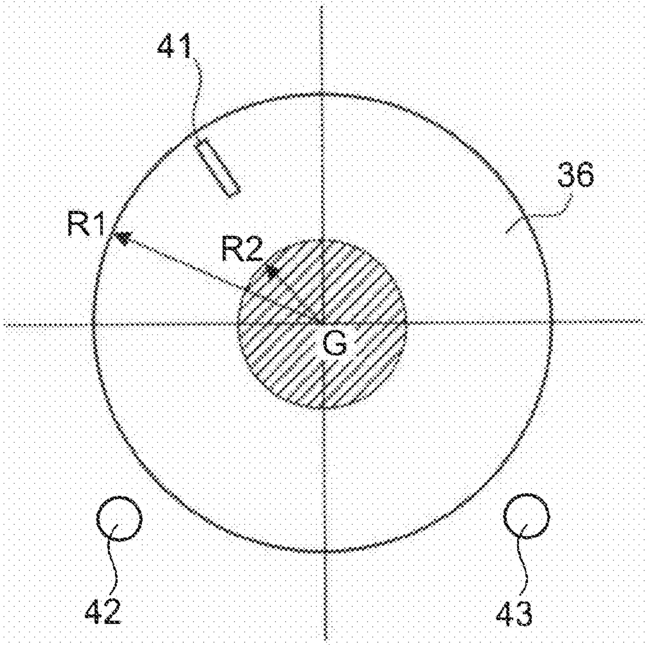
FIG. 14A is a diagram for illustrating a restriction region in which the click or drag operation is restricted.

Next, a description will be given of a restriction region of the click and drag operations (restriction region for restricting designation of the target volume value). FIG. 14A is a diagram for illustrating the restriction region.

As shown in FIG. 14A, a restriction region G is set as a predetermined region that concentrically expands from the center position O of the operation dial 36 and has a smaller area than the operation dial 36, for example. In this example, a radius R2 of the restriction region G is set to be about 40% of a radius R1 of the operation dial 36. However, a ratio thereof can appropriately be changed in setting. In the restriction region G, the click operation is restricted and a start of the drag operation is also restricted. The expression "restricted" means that the system processor 10 does not execute the processing based on the above conditions (5) to (10) even when the click operation is performed or the drag operation is started in the restriction region G.

It should be noted that the above conditions (8) to (10) are applied when the drag operation is started in the drag regions D to F outside the restriction region G and the drag operation is ended inside the restriction region G. In contrast, the setting may be made such that the system processor 10 does not execute a target position update when the drag operation is started in the drag regions D to F outside the restriction region G and the drag operation is ended inside the restriction region G.

Figure 14B:
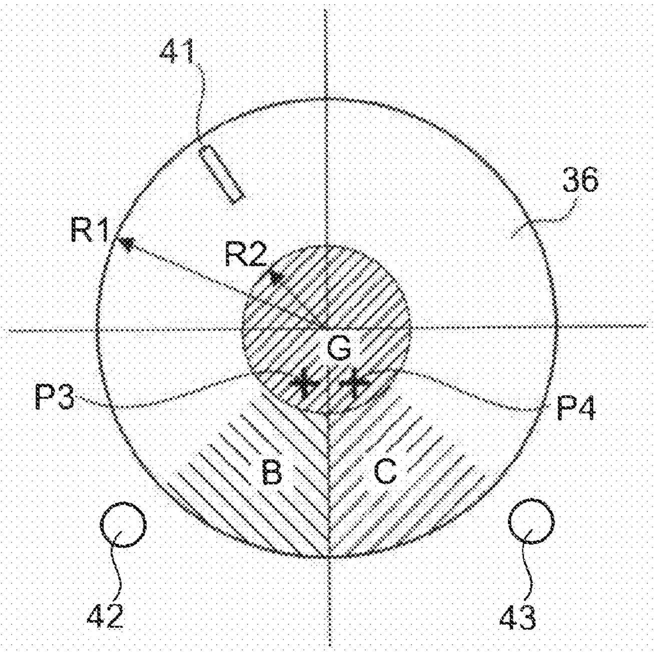
FIG. 14B is a diagram for illustrating a merit in setting the restriction region.

By thus setting the restriction region G, the following merits are obtained. As shown in FIG. 14B, the setting is effective when the user intends to click a position P3 of the click region B near the center of the operation dial 36 to minimize the volume but accidentally clicks a position P4 of the click region C near the center of the operation dial 36, for example. In this case, the erroneous operation can be prevented since the click operation is restricted in the restriction region G.

Figure 15A:
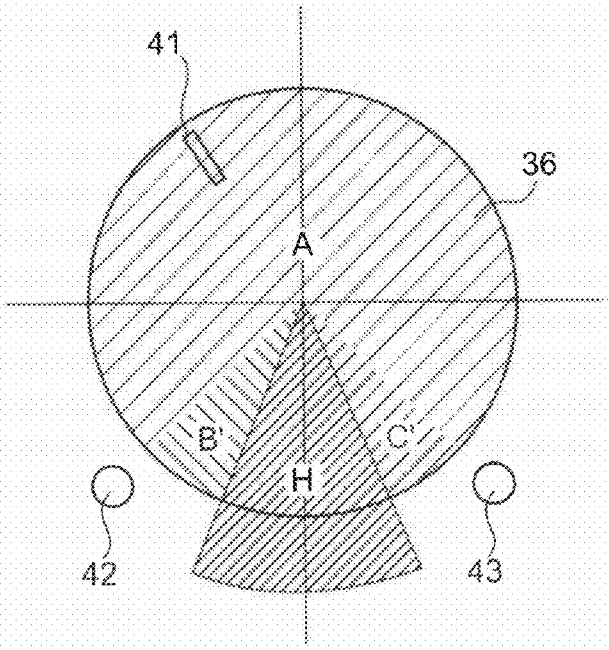
FIG. 15A is a diagram showing another example of the restriction region regarding the click and drag operations.

FIG. 15A is a diagram showing another example of the restriction region with respect to the click and drag operations. In this example, a region sandwiched between two click regions B' and C' which are adjacent to the click region A and spreads out toward an outer circumferential side of the operation dial 36 from the center thereof is set as a restriction region H.

It should be noted that the click regions B' and C' are operational regions in which the target volume value can be set by the click operation as in the click regions B and C.

Even when the drag operation is started in the restriction region H, in a case where the cursor moves to any of the drag regions D to F outside the restriction region H, in which the drag operation is effective, the system processor 10 calculates the target position corresponding to the cursor position in the drag region D, E, or F.

When the drag operation is started in the drag region D, E, or F and the cursor moves to the restriction region H, the system processor 10 does not execute the target position update. Alternatively, in contrast, the above conditions (8) to (10) may be applied even when the drag operation is started in the drag region D, E, or F and the cursor moves to the restriction region H.

Figure 15B:
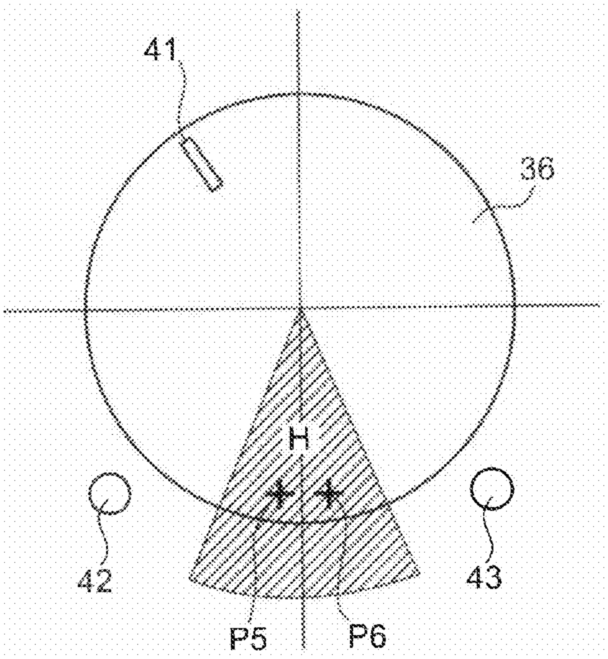
FIG. 15B is a diagram for illustrating a merit in setting the restriction region.

By thus setting the restriction region H, the following merits are obtained, which will be described with reference to FIG. 15B. The setting is effective when, in the click regions A to C shown in FIG. 11, the user intends to click a position P5 in the click region B (see FIG. 11) to minimize the volume but accidentally clicks a position P6 in the click region C (see FIG. 11), for example. In this case, the erroneous operation can be prevented since the click operation is restricted in the restriction region H.

Next, a volume control operation of the audio apparatus 100 will be described.

Figure 16:
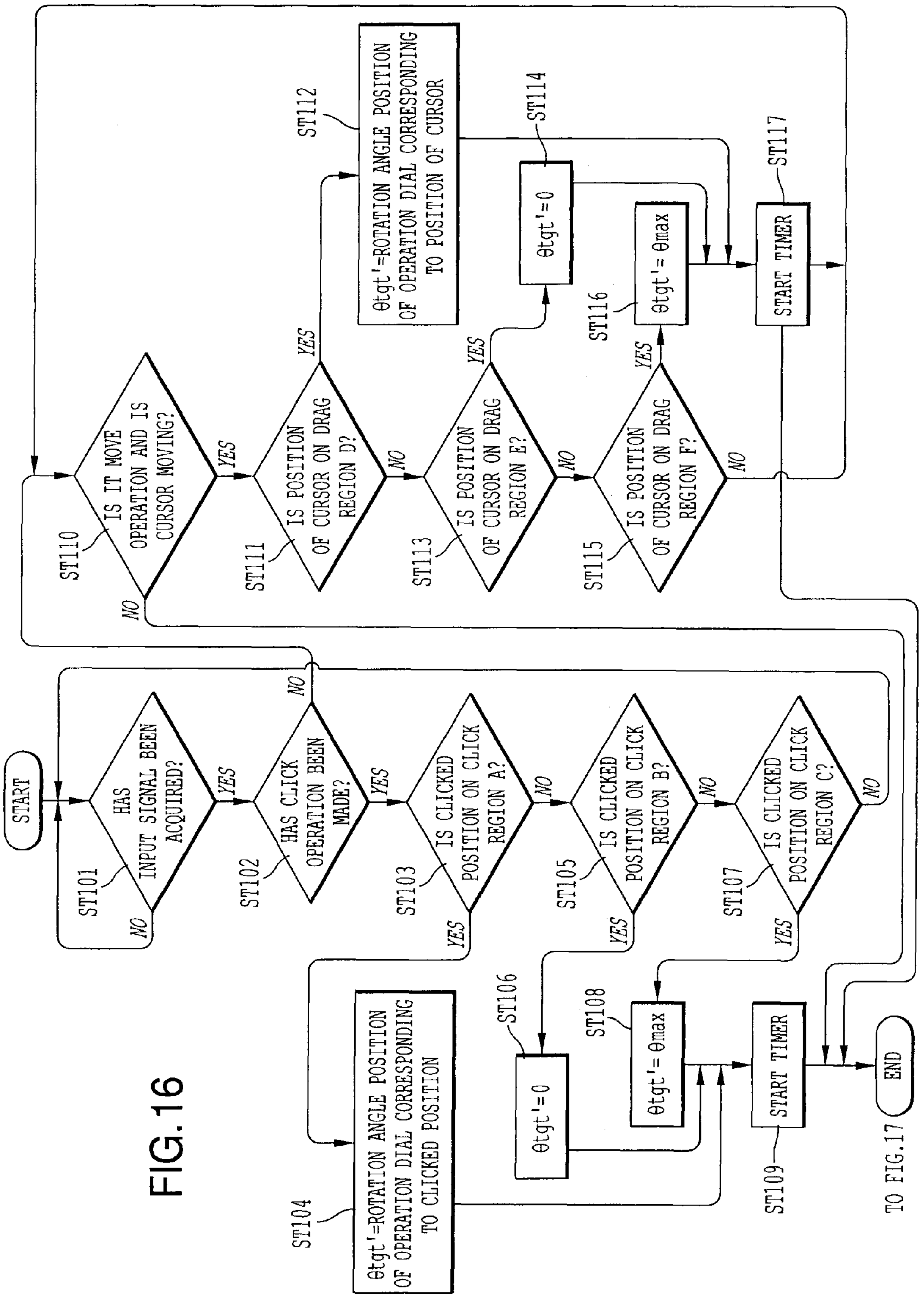
FIG. 16 is a flowchart showing operations upon the user pressing a button of an input device to designate the target volume value.

FIG. 16 is a flowchart showing operations upon the user pressing a button of the input device 16 to designate the target volume value.

The system processor 10 of the audio apparatus 100 is in a standby status regarding an input signal from the input device 16 operated by the user (Step 101).

When the input signal acquired through the input device 16 by the system processor 10 is a click operation signal in the click regions A to C (YES in Step 102), the system processor 10 judges whether the clicked position is on the click region A (Step 103).

When judging that the clicked position is on the click region A, the system processor 10 sets "θtgt'=rotation angle position of the operation dial 36 corresponding to the clicked position" (Step 104) and starts the timer (Step 109). After timer start, the system processor 10 advances to the flow shown in FIG. 17.

Here, regarding "θtgt'", the variable assigned with "'" means that, θtgt in a status before the start of the flow is changed to θtgt' by the processing of this flow, for example. In the flow shown in FIG. 16, it may be assumed that θtgt'=θtgt is established.

Referring to FIG. 16, when the clicked position is on the click region B (YES in Step 105), the system processor 10 sets "θtgt'=0" (Step 106) and starts the timer (Step 109).

When the clicked position is on the click position C (YES in Step 107), the system processor 10 sets "θtgt'=θmax" (Step 108) and starts the timer (Step 109).

Next, a description will be given of a case where the input signal is not the signal for the click operation in Step 102. Here, it should be noted for understanding the description of this embodiment that in the move operation, the pressed button is not yet released as described above. When the input signal is a signal for the move operation in the drag regions D to F (YES in Step 110), the system processor 10 performs processing as follows.

When the position of the cursor S is on the drag region D (YES in Step 111), the system processor 10 sets "θtgt'=rotation angle position of the operation dial 36 corresponding to the position of the cursor S" (Step 112) and starts the timer (Step 117). After timer start, the system processor 10 repeats the operations of Step 110 and the subsequent steps and executes the flow shown in FIG. 17.

When the position of the cursor S is on the drag region E (YES in Step 113), the system processor 10 sets "θtgt'=0" (Step 114) and starts the timer (Step 117).

When the position of the cursor S is on the drag region F (YES in Step 115), the system processor 10 sets "θtgt'=θmax" (Step 116) and starts the timer (Step 117).

NO in Step 110 refers to the case where the user ends the drag operation, that is, the operation in which the user releases the pressed button.

Figure 17:
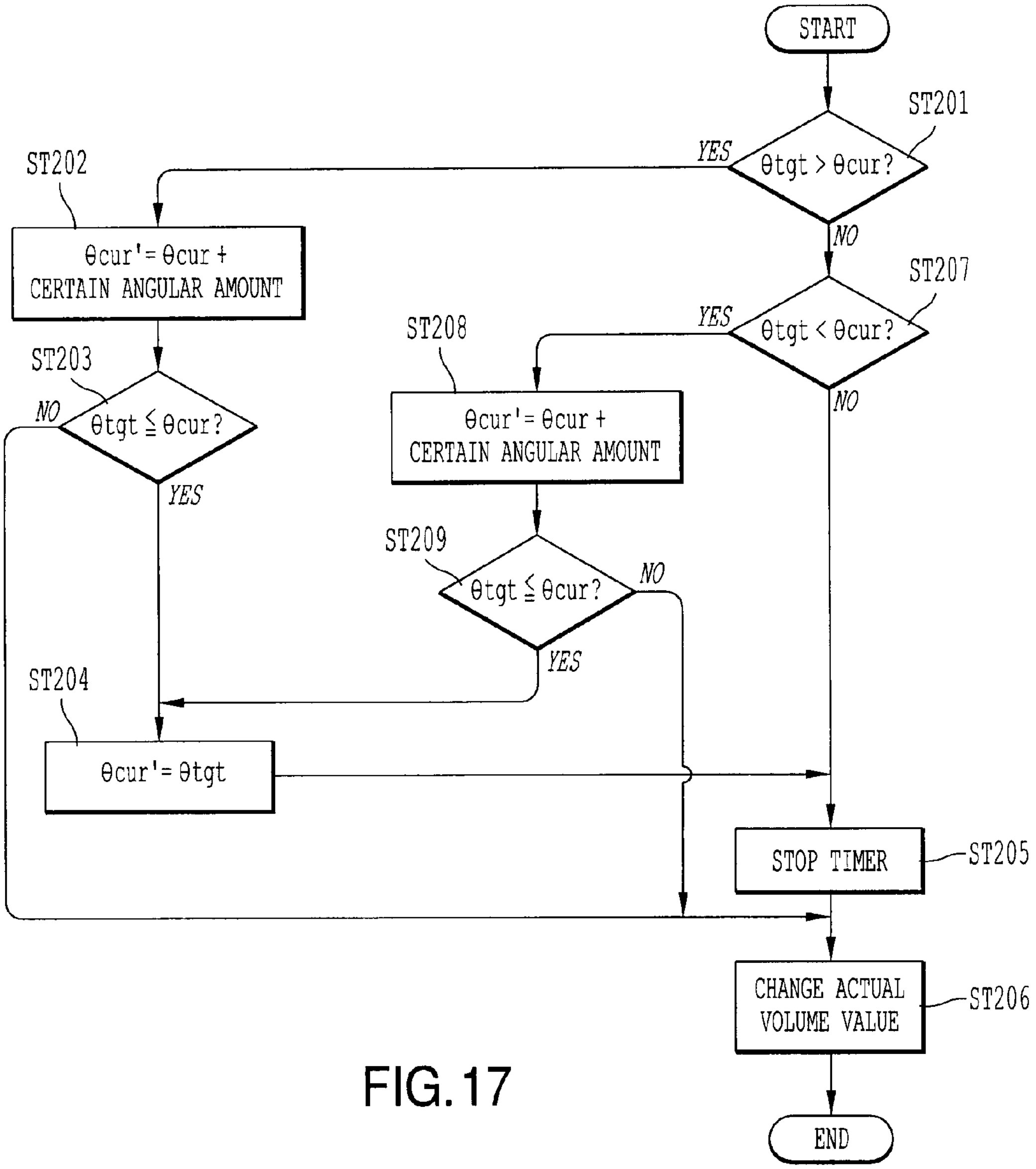
FIG. 17 is a flowchart showing operations of volume control after timer start.

Next, the volume control operation after the timer is thus started will be described with reference to FIG. 17.

When a certain time elapses during the operation of the timer, the system processor 10 advances to Step 201. The certain time is typically 25 ms, but of course is not limited thereto.

When θtgt>θcur (YES in Step 201), the system processor 10 sets "θcur'=θcur+certain angular amount" (Step 202). Specifically, in Step 202, the system processor 10 outputs to the display controller 13 an image signal so that the operation dial 36 is rotated clockwise to gradually approach the target position θtgt.

"θcur'" is the current volume value after the change by the input signal. As will be described later, the system processor 10 acquires and updates θtgt and θcur every time a certain time elapses to thereby obtain θtgt' and θcur' based on an instruction of the UI layer 21.

When "'tgt≦θcur" is established after Step 202 (YES in Step 203), the system processor 10 sets "θcur'=θtgt" (Step 204) and stops the timer (Step 205). Upon stop of the timer, the system processor 10 changes the actual volume value output from the audio decoder 17 (Step 206). The volume value that has been changed is output to the volume controller 28 as the volume signal to thereby change the volume output from the speaker 19. Although description will be given later, even though the system processor 10 typically changes the actual volume value every 125 ms, the interval is not limited thereto and can appropriately be changed together with the above-mentioned certain time 25 ms, for example.

When θtgt>θcur is not established in Step 201 but θtgt<θcur is established in Step 207, the system processor 10 sets "θcur'=θcur−certain angular amount" (Step 208). Specifically, in Step 208, the system processor 10 outputs to the display controller 13 an image signal so that the operation dial 36 is rotated counterclockwise to gradually approach the target position θtgt.

When "θtgt≦θcur" is established after Step 208 (YES in Step 209), the system processor 10 advances to Step 204.

As described above, the processing is performed such that the operation dial 36 is rotated to the rotation angle position corresponding to the designated target volume value and the volume is gradually changed until reaching the target volume value. In other words, the operation of the gradual movement of the operation dial 36 and the operation of the gradual change of the volume are interlocked. Thus, it is possible to give a premium accent to the movement of the operation dial 36, and the user can obtain an operational feeling similar to that in using the actual hardware apparatus.

In short, regarding the drag operation (move operation), the system processor 10 causes the operation dial 36 to rotate at a constant speed (or acceleration speed) following the position of the cursor S.

In the GUI-type audio apparatus as in the related art, when the user operates the dial for adjustment of the volume using a mouse or the like, for example, there has been a problem that the volume is drastically changed by the erroneous operation of the user. For example, there has been a fear that because many volume adjustment dials are round and of a rotary type, just by the user slightly moving the cursor S by the drag operation of the mouse near the center of the volume adjustment dial, a large sound unintended by the user is accidentally output. In addition, when the sound volume level is drastically turned up by the erroneous operation, the sound becomes offensive to the ear of the user and the load on the speaker is also increased. However, in this embodiment, because the sound volume level gradually changes even when an erroneous operation is performed by the user, the sounds do not become offensive to the ear of the user and the load on the speaker is reduced.

Next, with reference to FIGS. 18 to 24, a description will be given of the volume control operation seen from the DSD unit 20.

Figure 18:
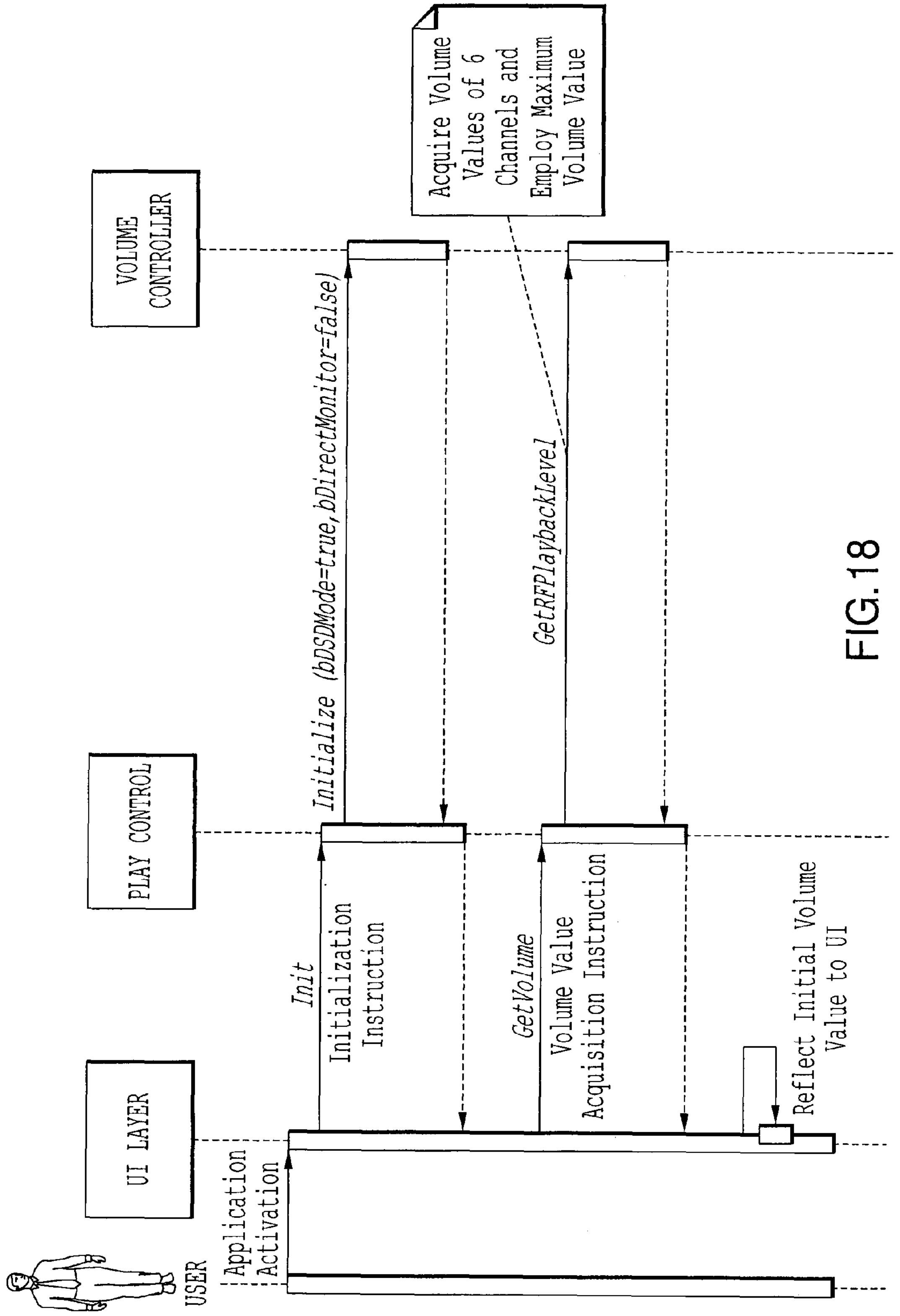
FIG. 18 is a sequence diagram showing operations at initialization of the audio apparatus.

FIG. 18 is a sequence diagram showing operations at a time of initialization of the audio apparatus 100.

In FIG. 18, the ordinate axes in the downward direction represent the elapse of time. When an application of the DSD unit 20 is activated by the user, the UI layer 21 instructs initialization to the volume controller 28 via the play control 22. Processing of the initialization may be publicly-known processing.

After the initialization, the UI layer 21 instructs the volume controller 28 to acquire a volume value at the current point (initial volume value) via the play control 22. The volume value at the current point is a PC system volume value in the case where the application of the audio apparatus 100 is applied to, for example, a PC. Upon acquisition of the initial volume value, the UI layer 21 reflects the value to the UI.

Figure 19:
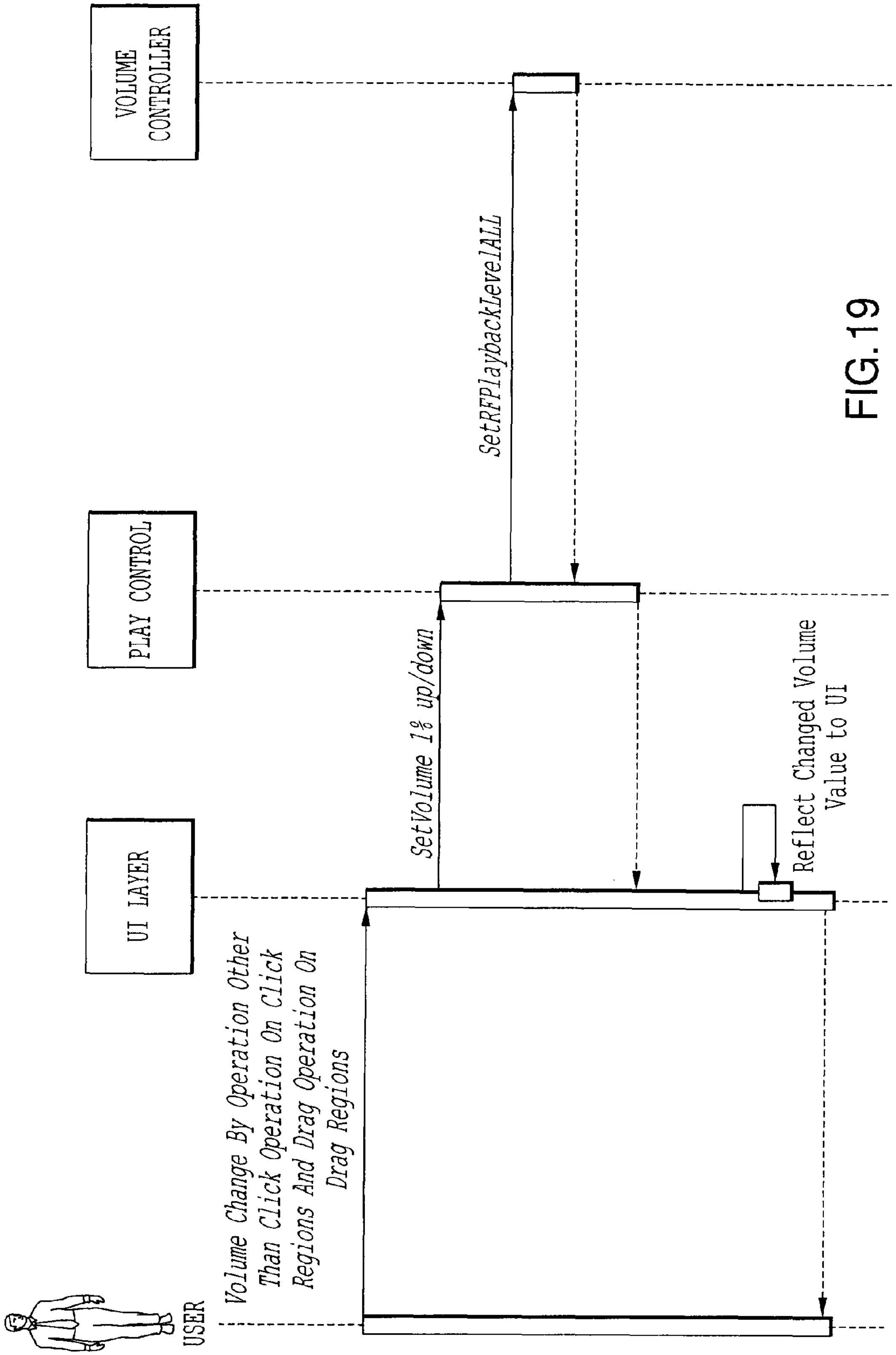
FIG. 19 is a sequence diagram showing operations when the volume is changed with an input device by an operation other than the click and drag operations.

FIG. 19 is a sequence diagram showing operations when the volume is changed using the input device 16 by an operation other than the click operations on the click regions A to C and drag operations on the drag regions D to F. The operation other than the click and drag operations refers to an operation using a button provided for minor volume adjustment, for example.

Examples of the button provided for minor volume adjustment typically include the following buttons.

±buttons 37 and 38 arranged in the volume operation unit 35 of the audio UI 30 shown in FIG. 3,

- in a case where the input device 16 is a keyboard, function keys thereof (e.g., F9 and F10),
- in a case where the input device 16 is a mouse, a wheel thereof (when the wheel is operated, the UI layer 21 acquires an On Mouse Wheel message from the mouse every predetermined time and executes processing similar to that in the case of using the ± buttons 37 and 38 and the function keys F9 and F10 of the keyboard every predetermined time), and
- in a case where the input device 16 is a remote controller, ± buttons thereof for volume control.

When the user presses those buttons once, the UI layer 21 instructs the volume controller 28 via the play control 22 to rotate the operation dial 36 by 1% and set a volume value obtained after the 1% change (SetVolume). The numeral of 1% can be changed appropriately. The UI layer 21 reflects the volume value that has been changed to the UI.

It should be noted that when the +buttons and the like of the audio UI 30 are pressed and held (press-and-hold), the UI layer 21 continuously performs the volume setting operation after the timer is started until the press-and-hold is released after a predetermined time has elapsed since the pressing of the button. The "press-and-hold" refers to an operation in which the user keeps pressing the button without releasing it.

Figure 20:
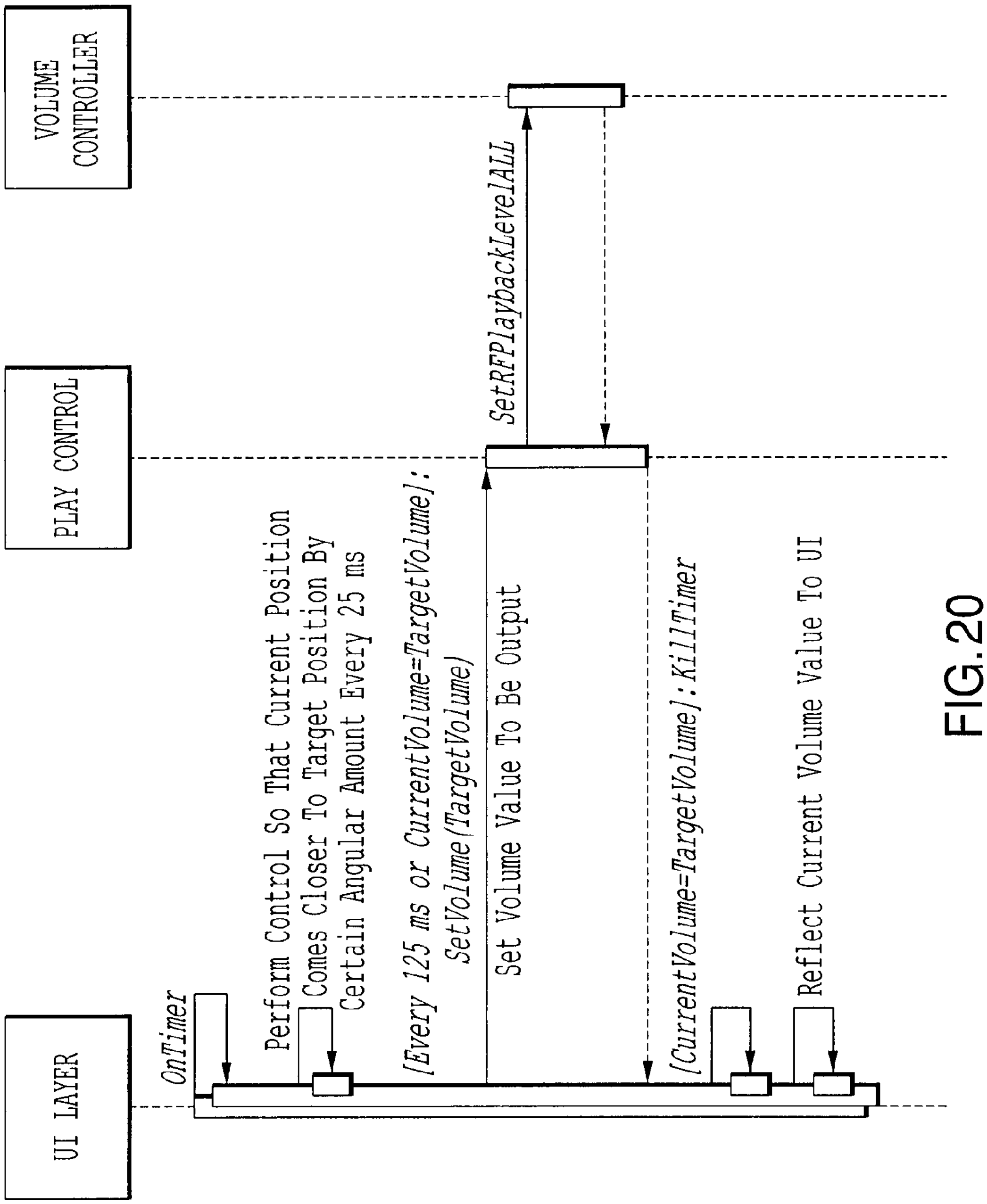
FIG. 20 is a sequence diagram showing timer processing.

FIG. 20 is a sequence diagram showing timer processing.

The UI layer 21 starts the timer (OnTimer) and moves the current position of the operation dial 36 closer to the target position every 25 ms, for example. Further, the UI layer 21 sets the volume to be actually output and instructs the setting to the volume controller 28 via the play control 22 every 125 ms, for example, or when the current position reaches the target position.

When the current volume value reaches the target volume value after the volume setting, the UI layer 21 stops the timer (KillTimer) and reflects this status to the UI.

In the timer processing sequence as described above, the UI layer 21 changes the actual volume value every 125 ms while executing the UI processing of the operation dial 36 every 25 ms.

Figure 21:
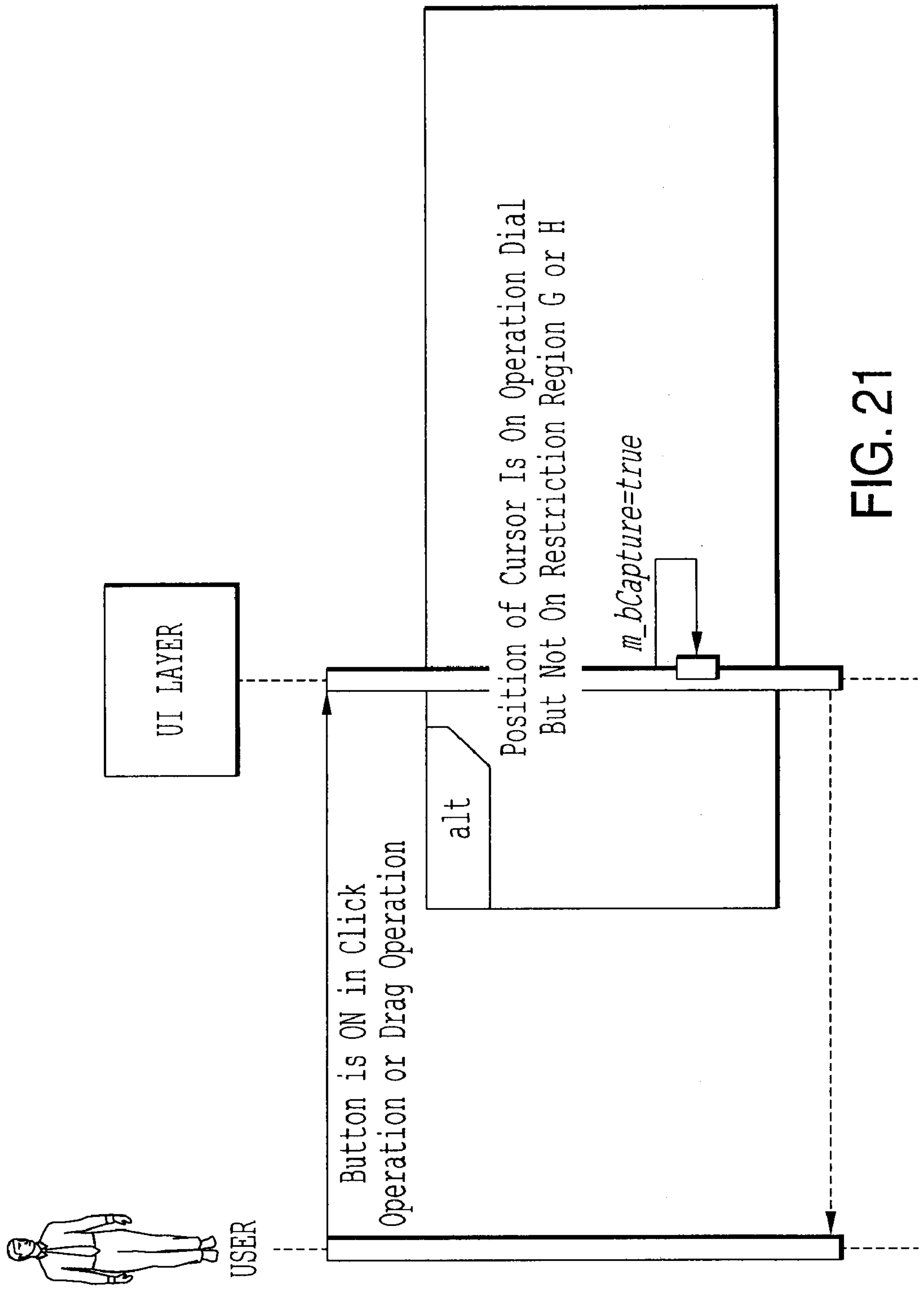
FIG. 21 is a sequence diagram showing operations of a UI layer when the button of the input device is pressed by the click or drag operation.

FIG. 21 is a sequence diagram showing operations of the UI layer 21 when the button of the input device 16 is pressed by the user through the click or drag operation.

When the position of the cursor S is on any of the click regions A to C or the drag regions D to F and not on the restriction region G or H when the user presses the button in the click or drag operation, a flag indicating that the click or drag operation has been started in the region in which the volume control is effective is set (m_bCapture=true).

Here, it needs to be understood that the expression "the click or drag operation has been started" only means that the button has been pressed. The operation performed when the button is released to end the click or move operation will be described with reference to FIGS. 22 and 23.

Figure 22:
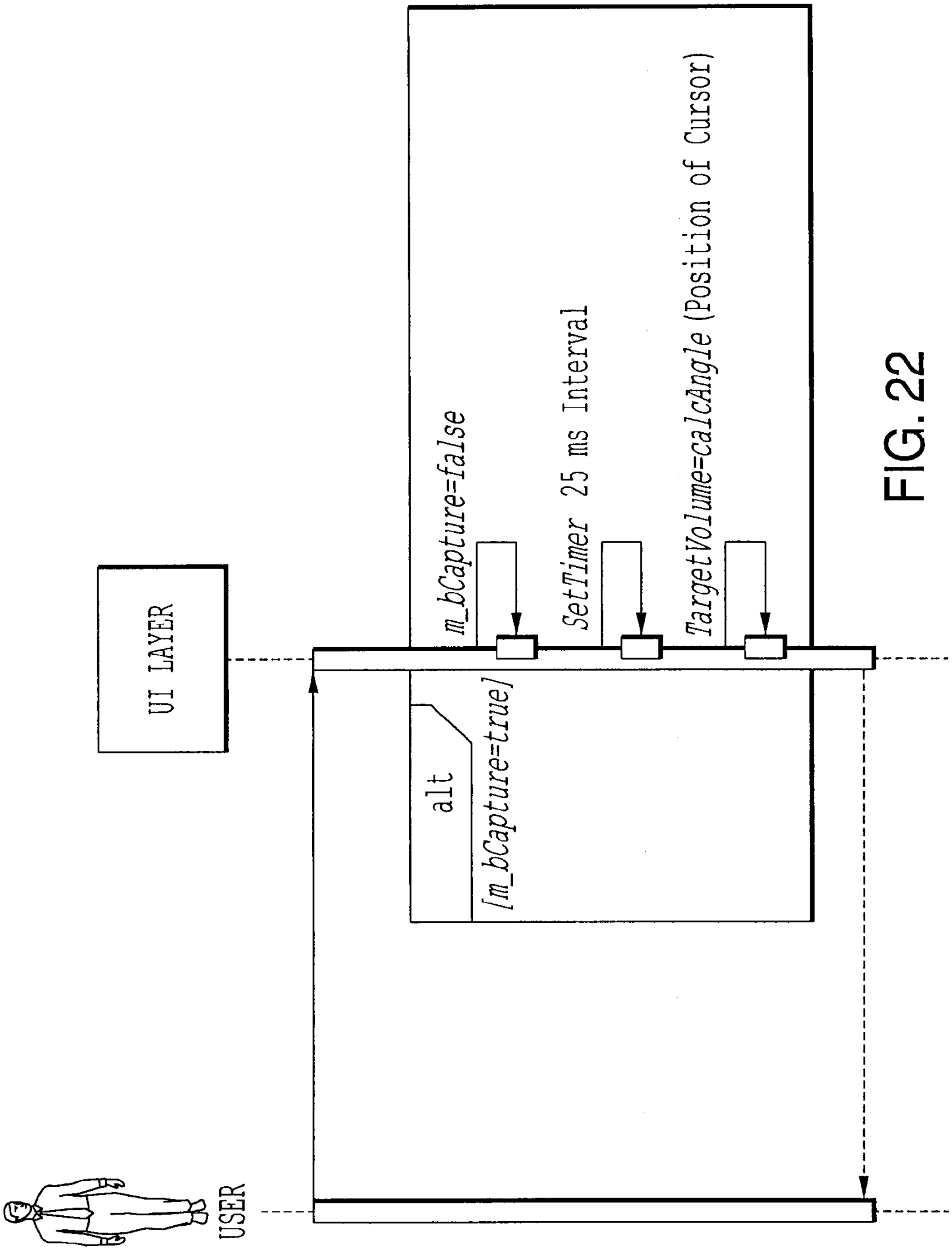
FIG. 22 is a sequence diagram showing operations subsequent to the operations of the UI layer when a flag is set in FIG. 21, which are performed when the pressed button is released.

FIG. 22 is a sequence diagram showing operations subsequent to those of the UI layer 21 when the flag is set in FIG. 21, which are performed when the pressed button is released.

When the user releases the button in the state where the flag is set (m_bCapture=true), the flag is canceled (m_bCapture=false) and the timer is started (SetTimer). After that, the UI layer 21 calculates the rotation angle position of the operation dial 36 corresponding to the target volume value based on the position of the cursor S.

Figure 23:
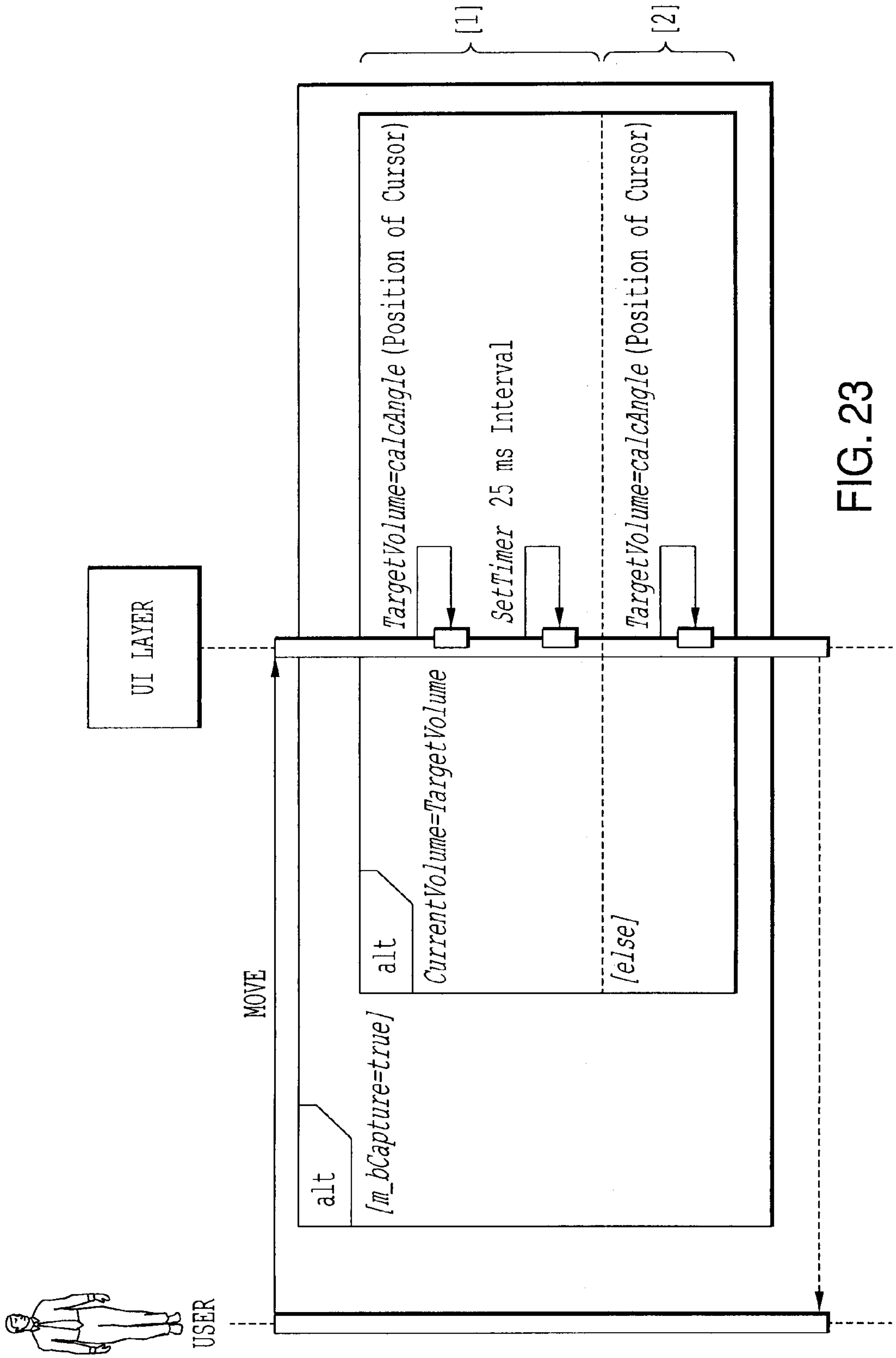
FIG. 23 is a sequence diagram showing operations subsequent to the operations of the UI layer when the flag is set in FIG. 21, which are performed when conducting a move operation.

FIG. 23 is a sequence diagram showing operations subsequent to those of the UI layer 21 when the flag is set in FIG. 21, which are performed when the move operation is performed.

In the state where the flag is set (m_bCapture=true), (1) is processing performed when the cursor S is temporarily stopped during the move operation. In the state of (1), the current volume value has already reached the target volume value. Thus, in this case, when the cursor S moves by the move operation, the UI layer 21 starts the timer (SetTimer).

(2) is processing performed during when the cursor S is moving in the move operation. In the state of (2), the current volume value has not yet reached the target volume value, and the timer is therefore in operation.

Figure 24:
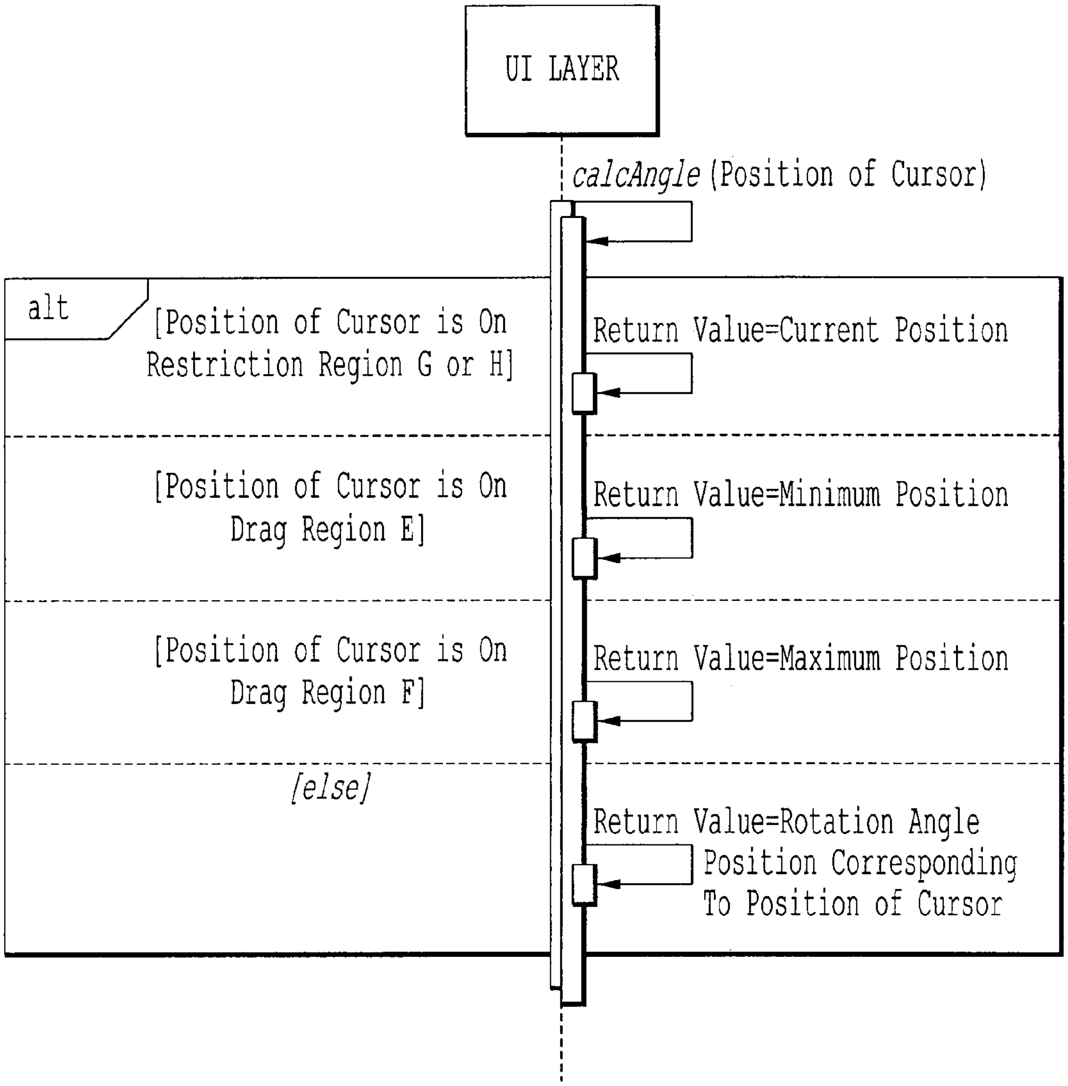
FIG. 24 is a sequence diagram showing operations of the UI layer for calculating the rotation angle position of the operation dial that corresponds to the target volume value according to a position of a cursor S.

FIG. 24 is a sequence diagram showing operations of the UI layer 21 for calculating the rotation angle position of the operation dial 36 corresponding to the target volume value based on the position of the cursor S.

The UI layer 21 calculates the target position (CalcAngle). When the position of the cursor S is on the restriction region H (or restriction region G), the UI layer 21 acquires the rotation angle position of the operation dial 36 corresponding to the position of the cursor S before entering the restriction region H. Needless to say, the position of the cursor S in this case refers to the position at which the click operation has been performed, the end point of the drag operation, or the position at which the cursor S is temporarily stopped during the move operation. The same holds true for the following descriptions.

When the position of the cursor S is on the drag region E, the UI layer 21 acquires the minimum position.

When the position of the cursor S is on the drag region F, the UI layer 21 acquires the maximum position.

When the position of the cursor S is neither of the three positions described above, then the UI layer 21 calculates the rotation angle position of the operation dial 36 corresponding to the position of the cursor S.

FIG. 25 are diagrams for illustrating a designation method of a volume value by the drag operation according to another embodiment of the present invention. In the drag operation described up to now, the position of the cursor S at the end point of the drag operation is assumed to be the target volume value. In this case, there is a fear that when the user unintentionally starts the drag operation at a position distant from the current position, the current position is largely changed.

Thus, in the example shown in FIG. 25, the system processor 10 executes processing to rotate the operation dial 36 only by a movement amount of the drag operation.

Figure 25A:
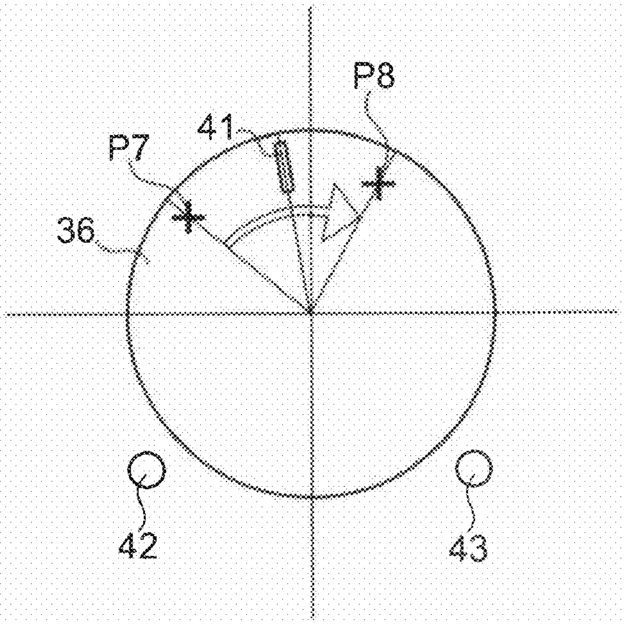
FIG. 25 are diagrams for illustrating a method of designating a volume value by a drag operation according to another embodiment of the present invention.
Figure 25B:
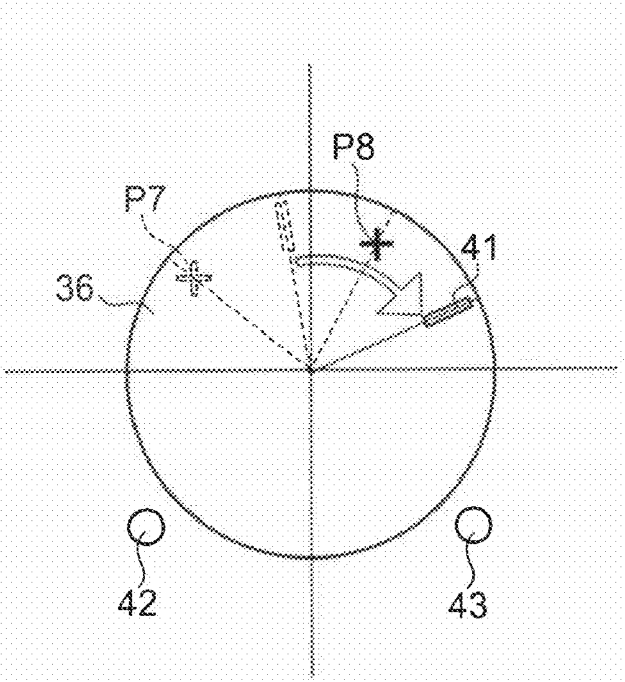

For example, it is assumed that the current position is set as shown in FIG. 25A. Upon performing the drag operation from a position P7 to a position P8 by the user, the operation dial 36 is rotated by the amount corresponding to the movement amount of the drag operation as shown in FIG. 25B. The movement amount of the drag operation refers to an angular difference between the rotation angle position corresponding to the start point of the movement and the rotation angle position corresponding to the end point thereof. The system processor 10 calculates the change amount of the volume value according to the angular difference. Therefore, in this case, the change amount of the volume value is determined irrespective of whether the movement of the cursor S in the drag operation is a linear movement or a curve movement.

By the designation method as described above, the volume value changes by the amount actually moved by the user in the drag operation, thereby facilitating intuitive operations.

FIG. 26 are diagrams for illustrating a designation method of a volume value by the drag operation according to still another embodiment of the present invention.

Figure 26A:
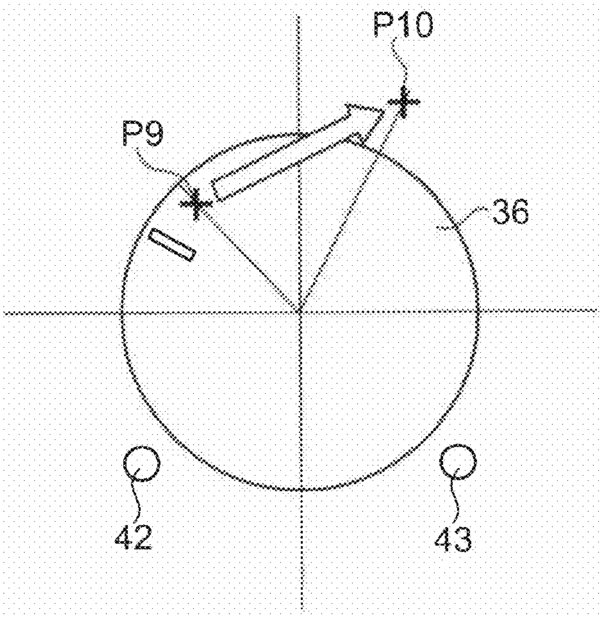
FIG. 26 are diagrams for illustrating a method of designating a volume value by a drag operation according to still another embodiment of the present invention.
Figure 26B:
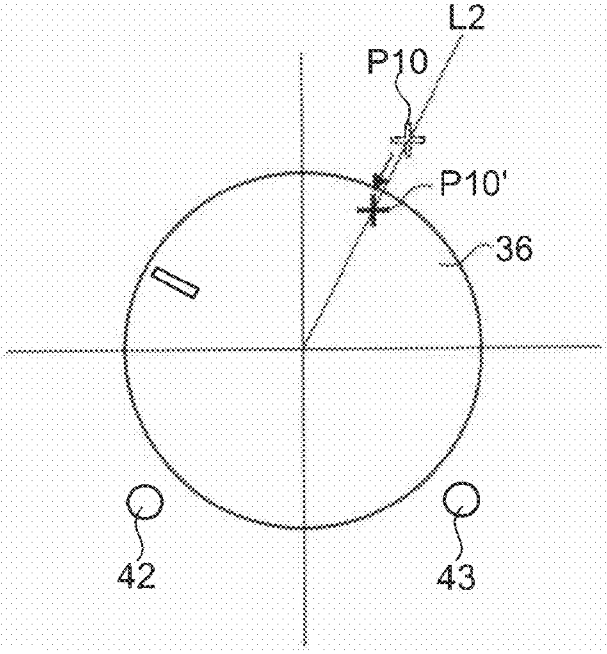

As shown in FIG. 26A, the user starts the drag operation from a position P9 as the start point. When a position P10 as the end point of the drag operation is positioned outside the volume operation unit 35, or typically outside the region in which the drag operation can be performed (drag region D), the system processor 10 performs processing as follows. Specifically, the system processor 10 performs processing such that the operation dial 36 is rotated to the rotation angle position corresponding to an angle formed between the start point and a straight line L2 connecting the center position O of the operation dial 36 and the position of the end point as shown in FIG. 26B. In addition, at this time, the system processor 10 updates the position of the cursor S so that the cursor S that moves according to the drag operation is positioned at a position P10' on the operation dial 36 and on the straight line L2. In this case, the position on the straight line on the radius may be set appropriately.

In this embodiment, even when the end point of the drag operation is outside the operation dial 36, appropriate volume control becomes possible. Further, because the end point is constantly on the operation dial 36 seen from the user, the operational feeling becomes closer to that of the user actually gripping the operation dial 36 and rotating it as in the case of an operation dial of a hardware apparatus. Thus, intuitive operations become possible.

Embodiments of the present invention are not limited to the embodiments described above, and various other embodiments may also be employed.

The "click" refers to the operation of the user pressing the button of the input device 16 up to release thereof. However, the "click" may refer to an operation of pressing the button, regardless of whether the pressed button has been released or not. In this case, the "drag operation" cannot be performed, so the designation method of the target volume value by the drag operation is also incapable of being performed.

The above embodiments have been described by taking the audio apparatus 100 as an example. However, the present invention is not limited thereto. For example, in a case of an illumination apparatus, the volume represents "size, intensity, and brightness" of light. Alternatively, in a case of a temperature control apparatus, the volume represents "level and magnitude" of a temperature. In addition, the volume may also be applied to "humidity" or "level" of pressure and the like. In other words, the "volume" is a level of parameters adjustable by the user and may be applied to any parameter as long as it is of a level that can be output by the volume control apparatus.

In the above embodiments, the click regions A to C, the drag regions D to F, and the restriction regions G and H have been set in advance. However, the user may be allowed to customize those regions.

What is claimed is:

1. An information processing apparatus, comprising:

a display control unit to cause image data of an operation unit including a graphical representation of a rotary operation dial to be displayed indicating a current volume value, and cause, after a target volume value is designated, the display of the operation dial to be rotated from a rotation angle position corresponding to the current volume value to a rotation angle position corresponding to the designated target volume value at a first rate; and an output unit to output a volume value corresponding to the rotation angle position of the operation dial displayed by the display control unit, the output volume value changed, after the target volume value is designated and after rotation of the display of the rotary operation dial is started, at a constant second rate lower than the first rate until the output volume value is equal to the designated target value.

2. The information processing apparatus according to claim 1, wherein the output unit outputs a sound volume level as the volume value.

3. The information processing apparatus according to claim 2, wherein the display control unit rotates the operation dial at a first speed when the current volume value is smaller than the target volume value and rotates the operation dial at a second speed faster than the first speed when the current volume value is larger than the target volume value.

4. The information processing apparatus according to claim 1, further comprising:

an operational region setting unit to set, on the image data displayed by the display control means, a first region for designating the target volume value according to the rotation angle position of the operation dial and a second region for designating the target volume value as one of a minimum volume value and a maximum volume value.

5. The information processing apparatus according to claim 1, further comprising:

a restriction region setting unit to set on the image data displayed by the display control unit, a restriction region in which the target volume value is incapable of being designated.

6. The information processing apparatus according to claim 5, wherein the restriction region setting unit sets a region that concentrically expands from a center of the operation dial and whose area is smaller than that of the operation dial as the restriction region.

7. The information processing apparatus according to claim 5, further comprising:

an operational region setting unit to set, on the image data displayed by the display control unit, a first region for designating the target volume value according to the rotation angle position of the operation dial, a second region adjacent to the first region, for designating the target volume value as a maximum volume value, and a third region adjacent to the first region, for designating the target volume value as a minimum volume value, wherein the restriction region setting unit sets a region sandwiched between the second region and the third region as the restriction region.

8. The information processing apparatus according to claim 1, wherein the display control unit rotates the operation dial from the rotation angle position corresponding to the current volume value to the rotation angle position corresponding to an angle of a straight line connecting a center position of the operation dial and a position designated on the image data.

9. The information processing apparatus according to claim 1, further comprising:

a calculation unit to calculate, when the target volume value is designated by a drag operation on the image data, an angular difference between the rotation angle position of the operation dial corresponding to a start point of the drag operation and the rotation angle position of the operation dial corresponding to an end point of the drag operation, wherein the output unit calculates a change amount of the volume value corresponding to the angular difference.

10. The information processing apparatus according to claim 9, wherein the display control unit rotates, when a position of the end point of the drag operation is outside the operation unit, the operation dial to the rotation angle position corresponding to an angle of a straight line connecting a center position of the operation dial and the position of the end point.

11. The information processing apparatus according to claim 10, wherein the display control unit positions a pointer that moves according to the drag operation on the straight line above the operation dial.

12. An information processing apparatus, comprising:

an output unit to output a volume value to, after a target volume value is designated and after rotation of a graphical representation of a rotary operation dial is started, change a current volume value at a constant first rate until the volume value reaches the designated target volume value; and a display control unit to cause image data of an operation unit including the graphical representation of the rotary operation dial to be displayed indicating a current volume value, and cause, after the target volume value is designated, the display of the operation dial to be rotated from a rotation angle position corresponding to the current volume value to a rotation angle position corresponding to the target volume value at a second rate different than the first rate.

13. An information processing method, comprising the steps of:

displaying, by a display unit, image data of an operation unit including a graphical representation of a rotary operation dial;

rotating, after a target volume value is designated, the display of the operation dial from a rotation angle position corresponding to a current volume value to a rotation angle position corresponding to the target volume value at a first rate; and outputting a volume value corresponding to the rotation angle position of the operation dial displayed by the display unit, the output volume value changed, after the target volume value is designated and after rotation of the display of the rotary operation dial is started, at a constant second rate lower than the first rate until the output volume value is equal to the designated target value.

14. A non-transitory computer readable storage medium having executable instructions stored therein, which when executed by a processor in an information processing apparatus causes the processor to execute the processing of:

displaying, by a display unit, image data of an operation unit including a graphical representation of a rotary operation dial;

rotating, after a target volume value is designated, the display of the operation dial from a rotation angle position corresponding to a current volume value to a rotation angle position corresponding to the target volume value at a first rate; and outputting a volume value corresponding to the rotation angle position of the operation dial displayed by the display unit, the output volume value changed, after the target volume value is designated and after rotation of the display of the rotary operation dial is started, at a constant second rate lower than the first rate until the output volume value is equal to the designated target value.

15. An information processing apparatus, comprising:

display control means for causing image data of an operation unit including a graphical representation of a rotary operation dial to be displayed indicating a current volume value, and causing, after a target volume value is designated, the display of the operation dial to be rotated from a rotation angle position corresponding to a current volume value to a rotation angle position corresponding to the target volume value at a first rate; and output means for outputting a volume value corresponding to the rotation angle position of the operation dial displayed by the display control unit, the output volume value changed, after the target volume value is designated and after rotation of the display of the rotary operation dial is started, at a constant second rate lower than the first rate until the output volume value is equal to the designated target value.

16. An information processing apparatus, comprising:

output means for outputting a volume signal to, after a target volume value is designated and after rotation of a graphical representation of a rotary operation dial is started, change a current volume value at a constant first rate until the volume value reaches the designated target volume value; and display control means for causing image data of an operation unit including a graphical representation of a rotary operation dial to be displayed indicating a current volume value, and causing, after the target volume is designated, the display of the operation dial to be rotated from a rotation angle position corresponding to the current volume value to a rotation angle position corresponding to the target volume value at a second rate different than the first rate.

* * * * *